(12) United States Patent
Date et al.

(10) Patent No.: US 12,581,223 B2
(45) Date of Patent: Mar. 17, 2026

(54) OPTICAL PATH ROUTE DESIGN DEVICE AND OPTICAL PATH ROUTE DESIGN METHOD

(71) Applicant: Nippon Telegraph and Telephone Corporation, Tokyo (JP)

(72) Inventors: Hiroki Date, Musashino (JP); Takeshi Seki, Musashino (JP); Takeshi Kawasaki, Musashino (JP); Hideki Maeda, Musashino (JP)

(73) Assignee: NTT, Inc., Tokyo (JP)

( * ) Notice: Subject to any disclaimer, the term of this patent is extended or adjusted under 35 U.S.C. 154(b) by 298 days.

(21) Appl. No.: 18/570,306

(22) PCT Filed: Jun. 14, 2021

(86) PCT No.: PCT/JP2021/022521
§ 371 (c)(1),
(2) Date: Dec. 14, 2023

(87) PCT Pub. No.: WO2022/264209
PCT Pub. Date: Dec. 22, 2022

(65) Prior Publication Data
US 2024/0223925 A1        Jul. 4, 2024

(51) Int. Cl.
H04B 10/032        (2013.01)
H04B 10/29        (2013.01)
(Continued)

(52) U.S. Cl.
CPC ....... H04Q 11/0062 (2013.01); H04B 10/032 (2013.01); H04B 10/29 (2013.01);
(Continued)

(58) Field of Classification Search
CPC .... H04B 10/032; H04B 10/038; H04B 10/29; H04J 14/0291; H04J 14/0295;
(Continued)

(56) References Cited

U.S. PATENT DOCUMENTS

2003/0147645 A1*  8/2003  Imajuku ............. H04Q 11/0062
                                                              398/56
2010/0061722 A1*  3/2010  Hashiguchi ............. H04L 41/12
                                                              398/26
(Continued)

FOREIGN PATENT DOCUMENTS

WO      WO-2017179534 A1 * 10/2017  ............. H04L 69/40

OTHER PUBLICATIONS

Nakagawa et al., "Numerical Analysis of Adaptive Restoration in Optical Transport Networks," In Proceedings of the 24th Opto Electronics and Communications Conference (OECC) and 2019 International Conference on Photonics in Switching and Computing (PSC), Fukuoka, Japan, Jul. 7-11, 2019, 3 pages (Year: 2019).*
(Continued)

*Primary Examiner* — Li Liu
(74) *Attorney, Agent, or Firm* — Fish & Richardson P.C.

(57)        ABSTRACT

An optical path route design device includes a transmission/reception route selection unit, a candidate selection unit, an existence judgement unit, a maximum resource 3R selection unit, and a new 3R selection unit. The design device selects relay stations in which two transmission/reception end points are arranged, selects a route pair of an active system-0 route and a standby system-1 route, which connects the transmission/reception end points with each other and does not overlap each other, and a backup third route detouring from the route pair via one or more relay stations, and arranges a resource amount of predetermined wavelengths in a shared 3R which is on the third route and shared by a plurality of route pairs.

8 Claims, 16 Drawing Sheets

(51) Int. Cl.
　　*H04J 14/02*　　　　(2006.01)
　　*H04Q 11/00*　　　　(2006.01)

(52) U.S. Cl.
　　CPC ...... *H04J 14/0291* (2013.01); *H04J 14/0295*
　　　　(2013.01); *H04Q 2011/0073* (2013.01); *H04Q*
　　　　　*2011/0081* (2013.01); *H04Q 2011/0086*
　　　　　　　　　　　　　　　　(2013.01)

(58) Field of Classification Search
　　CPC ....... H04Q 11/0062; H04Q 2011/0073; H04Q
　　　　　　　　　　　　　　　　　2011/0081
　　USPC ................................................. 398/5, 6, 173
　　See application file for complete search history.

(56) References Cited

U.S. PATENT DOCUMENTS

2015/0350025 A1* 12/2015 Kadohata ................ H04L 45/62
　　　　　　　　　　　　　　　　　　370/254
2019/0238451 A1* 8/2019 Fujisawa ............... H04L 45/123

OTHER PUBLICATIONS

Nakagawa et al., "Numerical Analysis of Adaptive Restoration in Optical Transport Networks," In Proceedings of the 24th OptoElectronics and Communications Conference (OECC) and 2019 International Conference on Photonics in Switching and Computing (PSC), Fukuoka, Japan, Jul. 7-11, 2019, 3 pages.

* cited by examiner

OPTICAL PATH ROUTE DESIGN DEVICE AND OPTICAL PATH ROUTE DESIGN METHOD

CROSS-REFERENCE TO RELATED APPLICATIONS

This application is a National Stage application under 35 U.S.C. § 371 of International Application No. PCT/JP2021/022521, having an International Filing Date of Jun. 14, 2021. The disclosure of the prior application is considered part of the disclosure of this application, and is incorporated by reference in its entirety into this application.

TECHNICAL FIELD

The present invention relates to an optical path route design device and an optical path route design method for laying a third route as an additional standby system, in addition to a system-0 route as an active system and a system-1 route as a standby system through an optical transmission line using an optical fiber, an optical amplifier, and the like.

BACKGROUND ART

An optical network, in which an optical transmission line (optical path route) using optical fiber is laid to implement long-distance optical communication, is required to secure reliability at a time of disaster, to further improve efficiency of recovery work, and to shorten recovery time, due to frequent occurrence of disaster such as heavy rain and earthquake. In order to facilitate an optical network which is resilient to disaster, there is a technique of establishing a three-route structure by laying a third route (the third optical path route) in addition to a system-0 route (system-0 optical path route) and a system-1 route (system-1 optical path route).

In addition to establishing the three-route structure, installing a CD (Colorless Directionless) capability and a CDC (Colorless Directionless Contentionless) capability has been studied, to allow for switching between routes by remote control. The CD capability or the CDC capability is called CD/CDC. This type of conventional technique is described in NPL 1.

CITATION LIST

Non Patent Literature

[NPL 1] Masahiro Nakagawa, et al., "Numerical Analysis of Adaptive Restoration in Optical Transport Networks", [online], 2019, [searched on May 14, 2021], Internet <URL: https://ieeexplore.ieee.org/document/8818101>

SUMMARY OF THE INVENTION

Technical Problem

The third route is laid (installed) by detouring to a remote position away from the system-0 route and the system-1 route in order to avoid disaster, and therefore, the distance becomes long. Therefore, a plurality of 3R relay devices, each being switchable to another route by remote control and having a 3R (Regenerate: regenerate signal, Reshape: reshape waveform, and Retiming: reproduce timing) capability, are required along the third route. However, the 3R relay device is expensive, almost equal to a transponder which is deployed at either end of the optical path route and transmits and receives an optical signal. Therefore, there is a problem that costs of installing the third route by way of an optical path route are high for implementing a three-route structure.

The present invention has been made in view of such circumstances, and it is an object of the present invention to reduce costs of installing a third route when implementing a three-route structure in an optical network by way of three optical path routes.

Solution to Problem

In order to solve the above problem, an optical path route design device of the present invention is characterized in that the optical path route design device includes: a transmission/reception route selection unit that selects relay stations in which two transmission/reception end devices to transmit/receive optical signals with each other are arranged from among a plurality of relay stations connected to each other through optical transmission lines and relaying the optical signals, connects the transmission/reception end devices with each other, and selects a route pair of an active system-0 route and a standby system-1 route, which do not overlap with each other, and a backup third route detouring from the route pair via one or more relay stations; a candidate selection unit that selects relay stations scattered on the selected third route as candidates in which 3R-capable (3R: Regenerate, Reshape, and Retiming) units to relay optical signals of predetermined wavelengths are arranged; an existence judgement unit that judges whether or not a shared 3R-capable unit exists in the selected candidate; a new 3R selection unit that newly selects a shared 3R-capable unit from among the shared 3R-capable units in the selected candidates, when the existence judgement unit has judged as being non-existent; and a maximum resource 3R selection unit that, when the existence judgement unit has judged as being existent, selects one shared 3R-capable unit if there is one existing shared 3R-capable unit, and selects a shared 3R-capable unit having the maximum number of wavelengths as a resource amount of communication if there is a plurality of existing shared 3R-capable units.

Advantageous Effects of Invention

According to the present invention, costs of installing a third route are reduced when a three-route structure is implemented in an optical network by way of three optical path routes.

DESCRIPTION OF EMBODIMENTS

Figure 1:
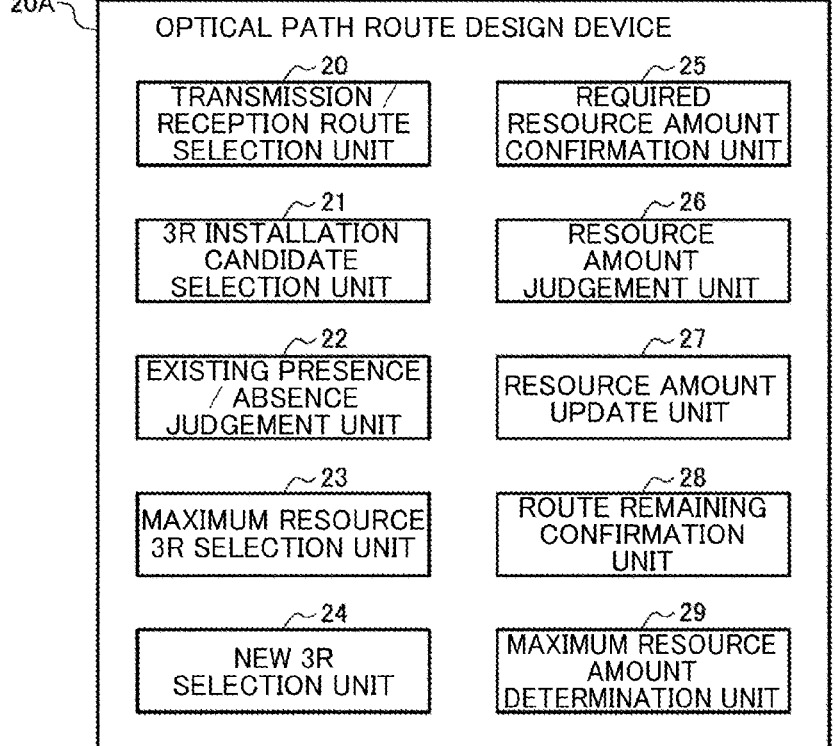
FIG. 1 is a block diagram showing a configuration of an optical path route design device according to a first embodiment of the present invention.

Hereinafter, embodiments of the present invention are described with reference to the drawings. However, the same reference numerals are given to the components corresponding to the functions in all the drawings for the present specification, and descriptions thereof are omitted as appropriate.

Configuration of First Embodiment

FIG. 1 is a block diagram showing a configuration of an optical path route design device according to a first embodiment of the present invention.

Figure 2:
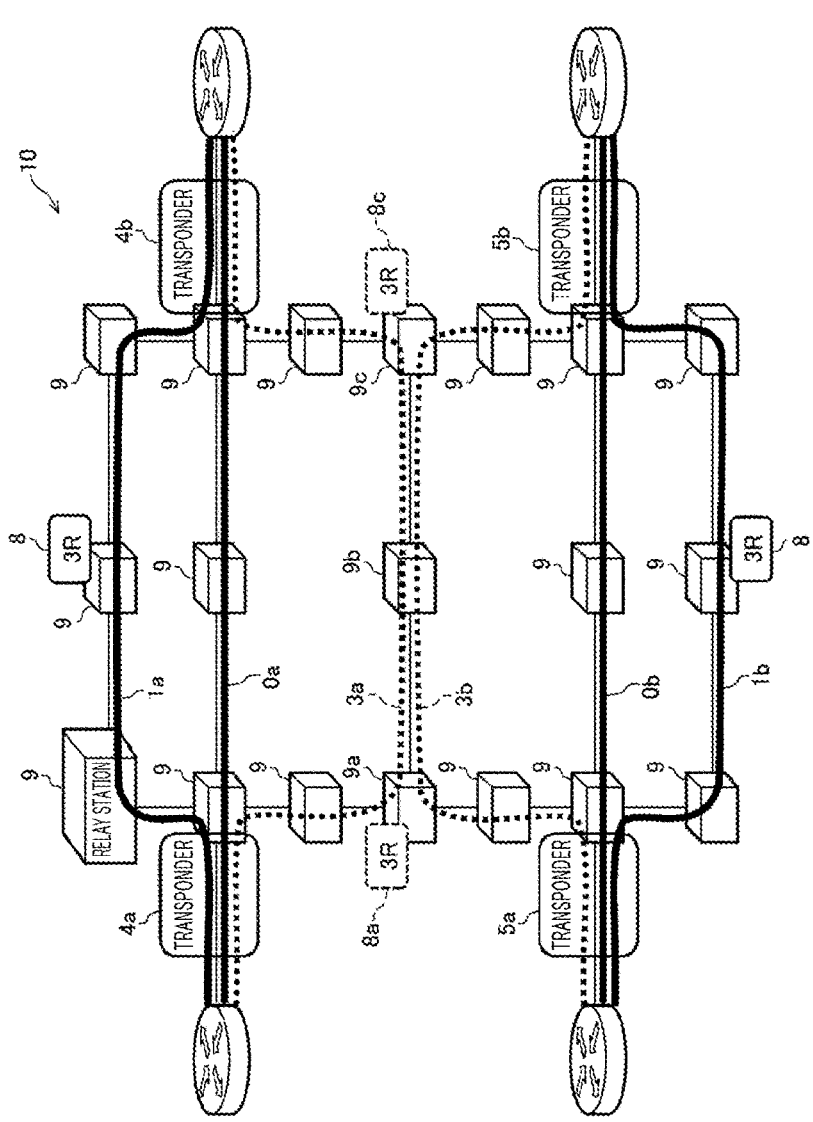
FIG. 2 is a configuration diagram showing an example of an optical network.

An optical path route design device (also referred to as the design device) 20A in FIG. 1 performs design to share 3R relay devices (also referred to as 3R) 8a and 8c connected along a third route 3a with another third route 3b in an optical network 10 in FIG. 2, when making an optical path route connecting transponders 4a and 4b, located at a long distance from each other, with each other so as to have a three-route structure. The transponder performs transmission/reception of optical signals and is also called a transmission/reception end point. Note that the transponder or the transmission/reception end point is a transmission/reception end device described in one or more claims. In addition, the 3R relay device or 3R is a 3R-capable unit described in one or more claims.

The design device 20A in FIG. 1 includes a transmission/reception route selection unit 20, a 3R installation candidate selection unit 21, an existence judgement unit 22, a maximum resource 3R selection unit 23, a new 3R selection unit 24, a required resource amount confirmation unit 25, a resource amount judgement unit 26, a resource amount update unit 27, an unprocessed route check unit 28, and a maximum resource amount determination unit 29. In the optical network 10 shown in FIG. 2, an optical path route, connecting the transmission/reception end points 4a and 4b with each other via optical transmission lines indicated by solid lines, has a three-route structure, with the third route 3a in addition to a system-0 route 0a as an active system and a system-1 route 1a as a standby system. Here, the design device 20A (see FIG. 1) makes a design to share the 3R relay devices 8a and 8c connected along the third route 3a with another third route 3b. This design allows for reducing costs of installing the third route when implementing a three-route structure. Note that the third route 3a may be one having the shortest distance next to the system-1 route 1a, or may be laid (installed) by detouring to a remote position away from the system-0 route 0a and system-1 route 1a, in order to avoid disaster.

The transmission/reception end points 4a and 4b are connected with each other by optical transmission lines via one or more relay stations 9 to relay optical signals, and the optical transmission lines include the system route-0 0a, the system-1 route 1a and the third route 3a. Similarly, other transponders 5a and 5b, located at a long distance from the transponders 4a and 4b, are connected with each other by optical transmission lines via the one or more relay stations 9, and the optical transmission lines include a system-0 route 0b, a system-1 route 1b and the third route 3b.

The system-0 route 0a and the system-1 route 1a between the transponders 4a and 4b are also referred to as a route pair 01a. The system-0 route 0b and the system-1 route 1b between the transponders 5a and 5b are also referred to as a route pair 01b.

A plurality of the relay stations 9 are respectively connected to the third route 3a of the route pair 01a and the third route 3b of the route pair 01b at predetermined intervals. Among these relay stations 9, relay stations 9a, 9b, and 9c are shared by two third routes 3a and 3b. Within the relay stations 9a, 9b, and 9c, the relay station 9a has the 3R relay device (3R) 8a deployed therein, and the relay station 9c has the 3R relay device 8c deployed therein.

The 3Rs 8a and 8c each have a 3R capability switchable between routes by remote control and are communication resources in the optical network 10. The 3Rs 8a and 8c each have capability of transmitting optical signals of different wavelengths as communication resources for transmitting the optical signals. An amount of resources of the transmission capability, as the communication resources, is proportional to the number of wavelengths of the transmittable optical signals, and increases as the number of wavelengths increases to 10, 20, and so forth. Note that the capability of transmitting optical signals of a plurality of wavelengths is also referred to as transmission capability of numbers of wavelengths.

For example, when having a transmission capability of 20 different wavelengths, the 3Rs 8a and 8c may relay and transmit optical signals of 20 wavelengths. In this case, one route of the third route 3a may transmit optical signals of 10 wavelengths, and the other route of the third route 3b may transmit optical signals of 10 wavelengths.

Thus, in this embodiment, at least one or more 3Rs (3R relay devices) are shared by the two or more independent third routes 3a and 3b. A 3R which is shared is also called a shared 3R. The shared 3R is provided with a transmission capability of the minimum number of wavelengths required when optical signals are transmitted via the two or more third routes 3a and 3b sharing the said 3R.

When a unitary link (unitary optical transmission line) constituting the route pair 01a or the route pair 01b fails, the 3Rs 8a and 8c shared by the two or more third routes 3a and 3b are not used simultaneously by the two or more third routes 3a and 3b, so that the resources are efficiently used by way of the shared 3Rs 8a and 8c.

Here, an example of a failure portion of the unitary link is described with reference to an optical network 10K shown in FIG. 3. In the optical network 10K, parts corresponding to the optical network 10 (FIG. 2) are denoted by the same reference numerals.

Figure 3:
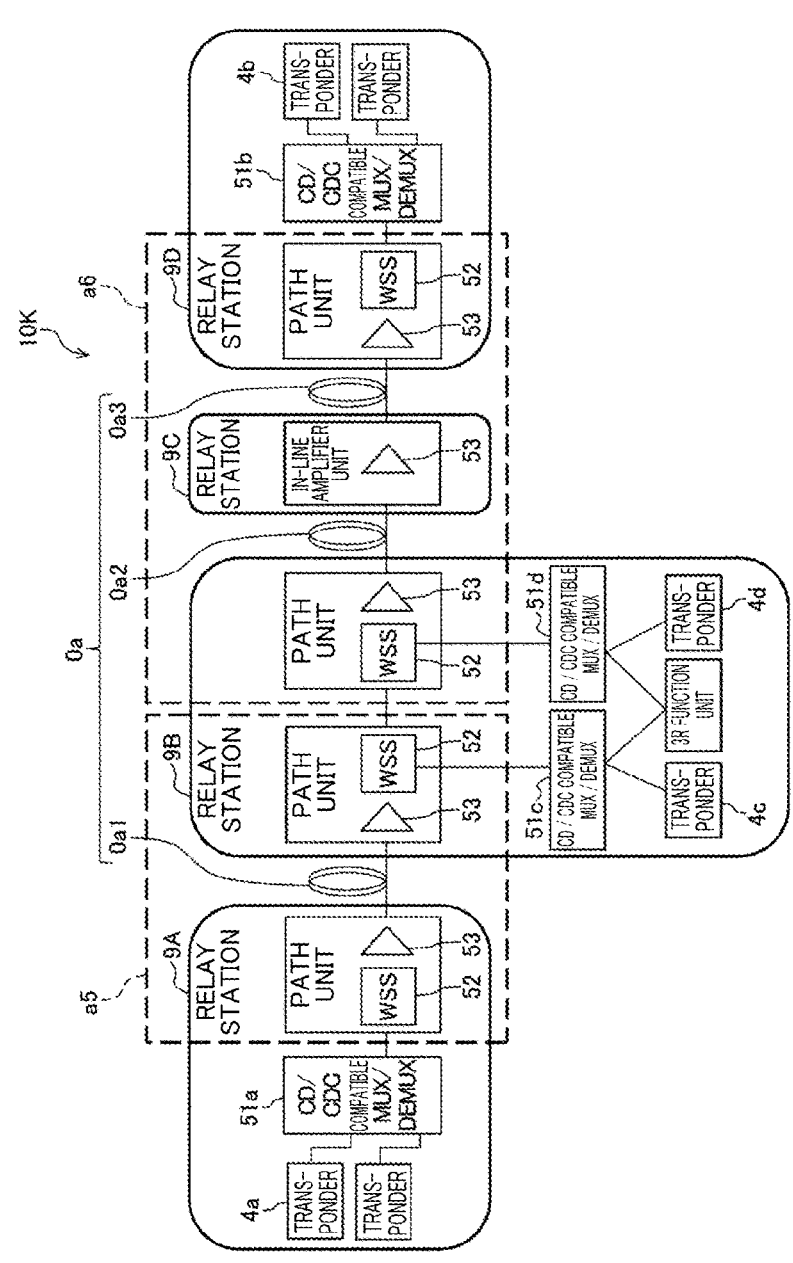
FIG. 3 is a block diagram showing a concrete configuration of the optical network between transmission/reception end points.

In the optical network 10K shown in FIG. 3, a transponder 4a is connected to one end of an optical fiber 0a corresponding to the system-0 route 0a (FIG. 2) via a MUX/DEMUX (Multiplexer/Demultiplexer) 51a corresponding to CD/CDC, and a transponder 4b is connected to the other end via a MUX/DEMUX 51b.

A relay station 9B composed of a path unit having a WSS (Wavelength Selective Switch) 52 and an optical amplifier 53 and a relay station 9C composed of an in-line amplifier unit having the optical amplifier 53 are connected between the MUX/DEMUXs 51a and 51b via the optical fiber 0a. The relay station 9A and the relay station 9B are connected with each other by an optical fiber 0a1, the relay station 9B and the relay station 9C are connected with each other by an optical fiber 0a2, and the relay station 9C and the relay station 9D are connected with each other by an optical fiber 0a3.

Transponders 4c and 4d are connected to the WSS 52 of the relay station 9B via a MUX/DEMUX 51c.

In the optical network 10K having such a configuration, a range between the path units of the relay stations 9a and 9b connected by an optical fiber 0a1, as enclosed by a broken line frame a5, is a first unitary link failure range. A range between the relay stations 9B and 9D connected by the optical fibers 0a2 and 0a3, with the relay station 9C in between, as enclosed by a broken line frame a6, is a second unitary link failure range. The correspondence relation also holds true for the system-1 route 1a, even though not shown. A plurality of such first and second unitary links are connected with each other to constitute the system-0 route 0a and the system-1 route 1a, and a failure of the route pair 01a or 01b may occur in the unitary link failure range a5 or a6.

Next, selecting and setting the shared 3R when there is a plurality of route pairs is described. However, it is assumed that three route pairs exist, which are the first route pair 01a in FIG. 4, the second route pair 01b in FIG. 5, and a third route pair 01c in FIG. 6.

Figure 4:
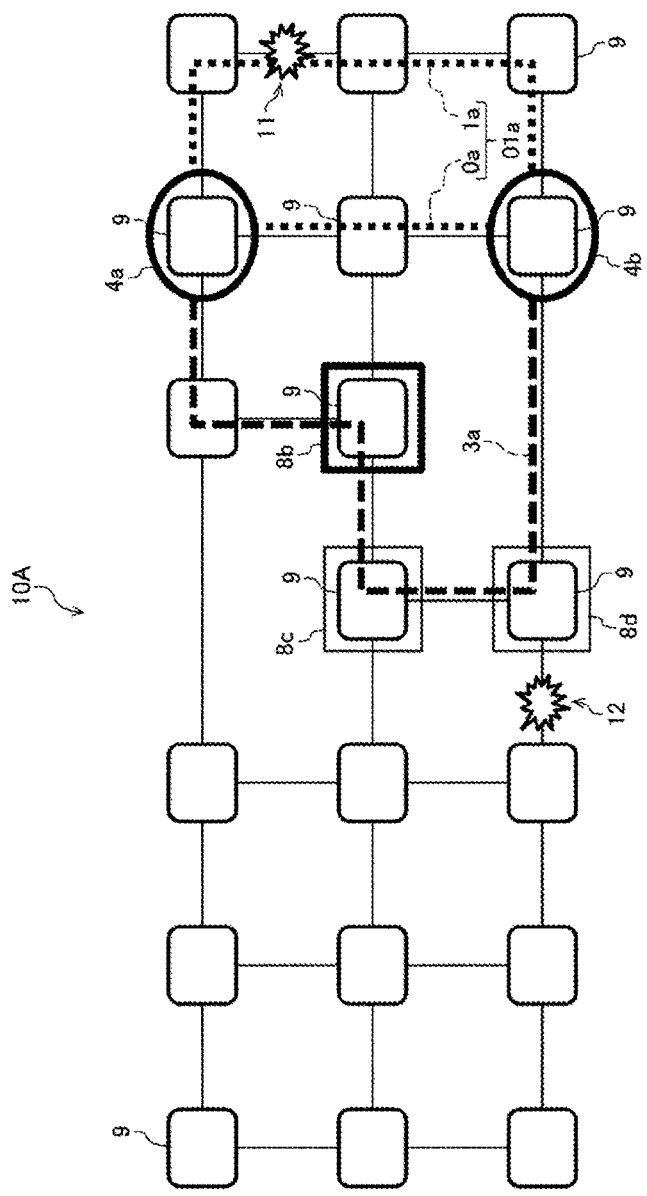
FIG. 4 is a configuration diagram showing an example of the optical network.

The optical network 10A shown in FIG. 4 is formed by connecting a plurality of the relay stations 9 arranged in a scattered manner over a wide range in the vertical and horizontal directions via the optical transmission lines indicated by solid lines. In the optical network 10A, the transponders (transmission/reception end points) 4a and 4b are arranged in the two relay stations 9.

The transmission/reception end points 4a and 4b are connected with each other by the system-0 route 0a in the shortest distance via the relay station 9 and the system-1 route 1a not overlapping with the system-0 route 0a, and further connected by a third route 3a detouring from the route pair (first route pair) 01a. The third route 3a connects the end points with each other via a plurality of the relay stations 9 away from each other, with one of the relay stations 9 as a candidate in which the 3R 8b is arranged, another one of the relay stations 9 as a candidate in which the 3R 8c is arranged, and still another one of the relay stations 9 as a candidate in which a 3R 8d is arranged.

Figure 5:
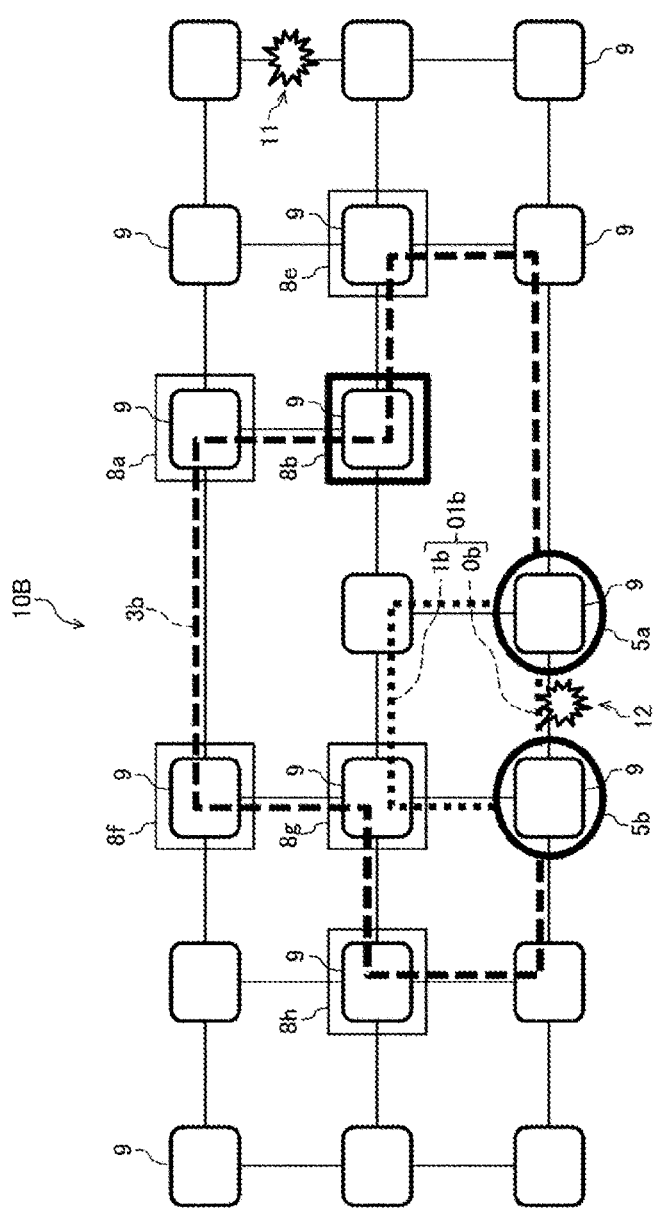
FIG. 5 is a configuration diagram showing an example of the optical network.

In an optical network 10B shown in FIG. 5, a plurality of the relay stations 9 are connected by the optical transmission lines, as with the optical network 10A, and the transponders (transmission/reception end points) 5a and 5b are arranged in the two relay stations 9 different from those in the optical network 10A.

The transmission/reception end points 5a and 5b are connected with each other by the system-0 route 0b and the system-1 route 1b, and connected by the third route 3b detouring from the route pair (second route pair) 01b. The third route 3b connects the end points with each other via a plurality of the relay stations 9 away from each other, with one of the relay stations 9 as a candidate in which the 3R 8a is arranged, another one of the relay stations 9 as a candidate in which the 3R 8b is arranged, and still another one of the relay stations 9 as a candidate in which a 3R 8e is arranged. Further, the three other relay stations 9 connected to the third route 3b are candidates in which 3Rs 8f, 8g and 8h are arranged.

Figure 6:
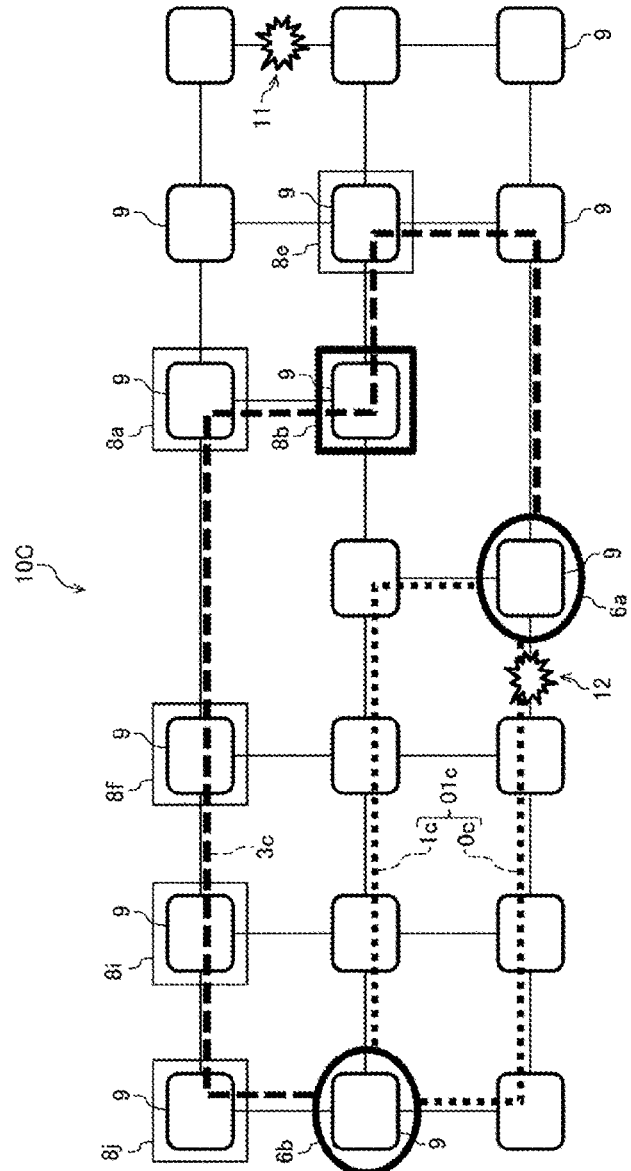
FIG. 6 is a configuration diagram showing an example of the optical network.

In an optical network 10C shown in FIG. 6, a plurality of the relay stations 9 are connected by the optical transmission lines, as with the optical network 10A, and transponders (transmission/reception end points) 6a and 6b are arranged in the two relay stations 9 different from those in the optical networks 10A and 10B.

Transmission/reception end points 6a and 6b are connected with each other by a system-0 route 0c and a system-1 route 1c, and connected by a third route 3c detouring from the route pair (third route pair) 01c. The third route 3c connects the end points with each other via a plurality of the relay stations 9 away from each other, with one of the relay stations 9 as a candidate in which the 3R 8a is arranged, another one of the relay stations 9 as a candidate in which the 3R 8b is arranged, and still another one of the relay stations 9 as a candidate in which an 3R 8e is arranged. Further, the three other relay stations 9 connected to the third route 3c are candidates in which 3Rs 8f, 8i and 8j are arranged.

In the optical path route design device 20A shown in FIG. 1, the transmission/reception route selection unit 20 selects transmission/reception end points, the system-0 routes, the system-1 routes and the third routes in the optical networks 10A to 10C shown in FIGS. 4 to 6.

That is, the transmission/reception route selection unit 20 (selection unit 20) selects the relay stations 9 to be assigned to serve as the two transmission/reception end points 4a and 4b for performing communication shown in FIG. 4 in response to one or more communication requests from a user (or communication demand). Then, the selection unit 20 selects the shortest route, connecting the transmission/reception end points 4a and 4b assigned to the selected relay stations 9, as the system-0 route 0a. Here, the system-0 route 0a may be a route to connect the transmission/reception end points 4a and 4b with each other via the minimum number of the relay stations 9 having optical amplifiers.

The selection unit 20 selects a route, which is not overlapped with the system-0 route 0a and is the shortest next to the 0 system-0 route 0a, as the system-1 route 1a. Further, the selection unit 20 selects the third route 3a not overlapping the first route pair 01a.

Next, the 3R installation candidate selection unit (also referred to as a candidate selection unit) 21 shown in FIG. 1 selects the relay stations 9 scattered on the third route 3a as candidates to have the 3Rs 8b, 8c and 8d arranged. Here, since the transmission distance varies with a modulation system of communication, transmission design is executed for selecting the relay stations 9 as candidates to have the 3Rs arranged by selecting a modulation system such as from the demand amount of communication and the total distance of the route.

Examples of the modulation system include 32 Gbaud-16QAM (Quadrature Amplitude Modulation) for 200 Gbps/λ, 32 Gbaud-QPSK (Quadra Phase Shift Keying) for 100 Gbps/λ, 64 Gbaud-16QAM for 400 Gbps/λ, and the like.

Each of the relay stations 9 as a 3R-arranged station is selected by way of the transmission design from a modulation system and information of a relay amplifier installed in the relay station 9 on a route. More precisely, the transmission design is performed from detailed information such as length/loss of/in spans (between the relay stations 9) and fiber types, but estimation is made first by using a span model and is confirmed finally by way of the transmission design. In the examples of the optical networks 10A to 10C shown in FIGS. 4 to 6, route design is performed after a span model in which one 3R is required for every three spans and the relay stations 9 preceding and following the 3R are also candidates to have the 3R arranged.

Next, the existence judgement unit 22 judges whether or not the selected candidate 3Rs 8b, 8c and 8d are already-assigned 3Rs. Since the candidate 3Rs 8b, 8c and 8d are selected for the first time, the existence judgement unit 22 judges as being non-existent.

When it is determined non-existent, the new 3R selection unit 24 newly selects, for example, the 3R 8b as a shared 3R from the candidate 3Rs 8b, 8c and 8d.

Here, the unprocessed route check unit 28 checks by judging whether or not there is any transmission/reception route selection left for another route pair, based on the one or more communication requests. When there is at least one left, the transmission/reception route selection unit 20 performs the selection, as with the above-described processing, based on the next order of the communication request.

After selecting the 3R 8b of the candidates for a shared 3R, the candidate selection unit 21 selects candidates for the shared 3Rs in the two third routes 3b and 3c of the remaining second and third route pairs 01b and 01c (see FIGS. 5 and 6). This selection is performed in the order of the one or more communication requests from the user. Here, the candidates 3R 8b shown in FIGS. 5 and 6 are selected in the order of the one or more communication requests.

Next, the existence judgement unit 22 judges whether or not the selected candidate 3Rs 8a, 8b and 8e are already assigned 3Rs. Here, since the candidate 3R 8b selected for the first time exists, it is judged that an assigned 3R of the 3R 8b exists among the candidate 3Rs.

After the judgement, when the existence judgement unit 22 has judged that the assigned 3R exists, the maximum resource 3R selection unit 23 selects the assigned 3R when there is one assigned 3R, and selects a 3R having the largest number of wavelengths as the resource amount when there is a plurality of assigned 3Rs. In this example, since there is only one assigned 3R 8b, the maximum resource 3R selection unit 23 selects the assigned 3R 8b as the shared 3R.

<Determining Resource Amount for Shared 3R>

Here, determining capability of transmitting numbers of wavelengths (resource amount) required for the selected shared 3R is described.

The required resource amount confirmation unit 25 (also referred to as the confirmation unit 25) shown in FIG. 1 selects one unitary link of each of the system-0 routes, such as 0a, of the route pairs 01a, 01b and 01c (FIGS. 4 to 6), and confirms the resource amount required for the shared 3R on the third route when the selected unitary link fails.

For example, it is assumed that a failure 11 has occurred in the system-1 route 1a of the first route pair 01a shown in FIG. 4, which uses 10 wavelengths. In this case, since the other second route pair 01b (FIG. 5) and the third route pair 01c (FIG. 6) do not have the system-0 route and the system-1 route including the unitary link having the failure 11, 10 wavelengths are required only on the third route 3a of the first route pair 01a. Therefore, the confirmation unit 25 confirms that the resource amount as capability of transmitting the optical signal of 10 wavelengths is required on the shared 3R 8b of the third route 3a.

The resource amount judgement unit 26 judges whether or not the confirmed resource amount exceeds the maximum required resource amount on design set in the shared 3R 8b.

When the resource amount judgement unit 26 has judged Yes, the resource amount update unit 27 updates the maximum required resource amount to be set to the shared 3R 8b with the resource amount confirmed by the confirmation unit 25. Note that the resource amount update unit 27 is an update unit in one or more claims.

When the resource amount judgement unit 26 has judged that the resource amount is equal to or less than the maximum required resource amount or when the resource amount update unit 27 has updated the resource amount, the unprocessed route check unit 28 checks whether or not there are any unitary links of the route pairs left for resource amount confirmation by the confirmation unit 25 in case of failure.

For example, the unprocessed route check unit 28 confirms that there is a unitary link, having a failure 12 in FIGS. 5 and 6, of the system-0 routes 0b and 0c of the second and third route pairs 01b and 01c left for resource amount confirmation. When there is at least one left, the required resource amount confirmation unit 25 and the resource amount judgement unit 26 perform the same processing as described above.

For example, at the time of the failure 12 as a failure of a unitary link of the system-0 routes 0b and 0c of the second and third route pairs 01b and 01c, each requiring 10 wavelengths, the number of wavelengths of 20 wavelengths obtained by adding 10 wavelengths required for transmission on each of the third routes 3b and 3c (10+10) is required on the shared 3R 8b.

Therefore, the confirmation unit 25 confirms that the resource amount as capability of transmitting the optical signal of 20 wavelengths is required on the shared 3R 8b. After the confirmation, it is assumed that the resource amount judgement unit 26 has updated the maximum required resource amount to be set on the shared 3R 8b from 10 wavelengths to 20 wavelengths, and the unprocessed route check unit 28 has confirmed that there is no unitary link left for checking.

In this case, the maximum resource amount determination unit 29 determines that the maximum required resource amount (for example, 20 wavelengths) is the predetermined resource amount of the shared 3R 8b. Note that the maximum resource amount determination unit 29 is a determination unit in one or more claims.

In the present embodiment, the 3R that can be shared by the third routes 3a, 3b and 3c of the first to third route pairs 01a, 01b and 01c (FIGS. 4 to 6) is the 3R 8b. The shared 3R 8b only needs to have a resource amount of the transmission capability of maximum 20 wavelengths. That is, since 10 wavelengths are required at the time of the failure 11 (FIGS. 4) and 20 wavelengths are required at the time of the failure 12 (FIGS. 5 and 6) on the shared 3R 8b of the three third routes 3a, 3b and 3c, the resource amount of the minimum number of wavelengths (20 wavelengths) is enough. A conventional technique has required a resource amount of 30 wavelengths by simply summing numbers of wavelengths required for transmission on the three third routes 3*a*, 3*b* and 3*c*.

Operations of First Embodiment

Next, operation of selecting a shared 3R on a third route in the optical path route design process by the optical path route design device 20A according to the first embodiment is described with reference to a flowchart in FIG. 7.

Figure 7:
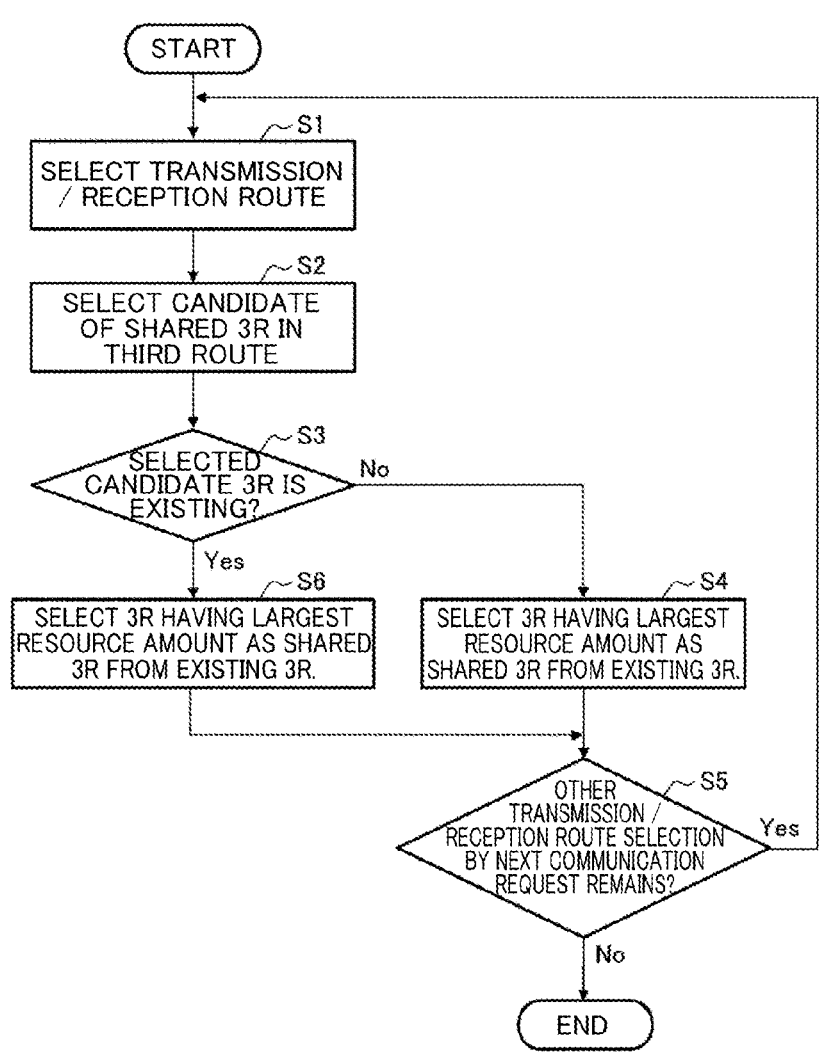
FIG. 7 is a flowchart to illustrate an optical path route design process by the optical path route design device according to the first embodiment.

In step S1 shown in FIG. 7, the transmission/reception route selection unit 20 of the design device 20A shown in FIG. 1 selects transmission/reception end points, a system-0 route, a system-1 route and a third route (called transmission/reception route selection) in the optical network 10A shown in FIG. 4 in response to a predetermined communication request or a demand.

That is, the selection unit 20 selects the relay stations 9 in which the two transmission/reception end points 4*a* and 4*b* to communicate with each other are arranged, as shown in FIG. 4, in response to a communication request from a user, for example. Then, the selection unit 20 selects the 0system-0 route 0*a* connecting the transmission/reception end points 4*a* and 4*b*, arranged in the selected relay stations 9, with each other and selects the system-1 route 1*a* not overlapping with the system-0 route 0*a*.

Next, in step S2, the 3R installation candidate selection unit 21 selects the relay stations 9 scattered on the third route 3*a* selected by the selection unit 20 as candidates in which 3Rs 8*b*, 8*c* and 8*d* are arranged. In this example, the 3R 8*c* is set as an aimed candidate, to have three candidates of itself and the 3Rs 8*b* and 8*d* on both sides thereof.

Next, in step S3, the existence judgement unit 22 judges whether or not the selected candidate 3Rs 8*b*, 8*c* and 8*d* are already-assigned 3Rs. Here, since the candidate 3Rs 8*b*, 8*c* and 8*d* are selected for the first time, it is judged as non-existent (No).

When it is judged as non-existent, the new 3R selection unit 24 newly selects, for example, the 3R 8*b* as a shared 3R from the candidate 3Rs 8*b*, 8*c* and 8*d* in step S4.

Next, in step S5, the unprocessed route check unit 28 checks by judging whether or not there is any transmission/reception route selection left for another route pair, based on the communication request. When it has been judged that there is none left (No), the selecting ends.

In contrast, when it has been judged that there is at least one left (Yes), the processing returns to step S1, and the transmission/reception route selection unit 20 selects transmission/reception end points, a system-0 route, a system-1 route and a third route in the optical network 10B shown in FIG. 5 in response to the next communication request.

That is, the selection unit 20 selects the relay stations 9 in which the two transmission/reception end points 5*a* and 5*b* shown in FIG. 5 are arranged, then selects the system-0 route 0*b* connecting the transmission/reception end points 5*a* and 5*b* with each other, selects the system-1 route 1*b*, and selects the third route 3*b*.

Next, in step S2, the 3R installation candidate selection unit 21 selects the relay stations 9 scattered on the third route 3*b* selected by the selection unit 20 as candidates in which the 3Rs 8*a*, 8*b* and 8*e* are arranged.

In step S3, the existence judgement unit 22 judges whether or not the selected candidate 3Rs 8*a*, 8*b* and 8*e* are already-assigned 3Rs. Here, since the 3R 8*b* is already assigned, it is judged as being existent (Yes).

In the case of being judged as being existent, the maximum resource 3R selection unit 23 selects a 3R having the largest resource amount in the already-assigned 3Rs as a shared 3R in step S6. Here, since there is only one already-assigned 3R of the 3R 8*b*, the 3R 8*b* is selected as the shared 3R.

Next, in step S5, the unprocessed route check unit 28 checks by judging whether or not there is any transmission/reception route selection left for another route pair, based on the communication request. Here, it is assumed that there is still transmission/reception route selection left (Yes).

On the basis of judging that there is at least one left (Yes), the processing returns to step S1, and the transmission/reception route selection unit 20 selects transmission/reception end points, a system-0 route, a system-1 route and a third route in the optical network 10C shown in FIG. 6 in response to the next communication request.

That is, the selection unit 20 selects the relay stations 9 in which the two transmission/reception end points 6*a* and 6*b* shown in FIG. 6 are arranged, then selects the system-0 route 0*c* connecting the transmission/reception end points 6*a* and 6*b* with each other, selects the system-1 route 1 *c*, and selects the third route 3*c*.

Next, in step S2, the 3R installation candidate selection unit 21 selects the relay stations 9 scattered on the third route 3*c* selected by the selection unit 20 as candidates in which the 3Rs 8*a*, 8*b* and 8*e* are arranged.

In step S3, the existence judgement unit 22 judges that the 3R 8*b* is already assigned from the selected candidate 3Rs 8*a*, 8*b* and 8*e* (Yes). In step S6, the maximum resource 3R selection unit 23 selects the already-assigned 3R 8*b* as the shared 3R having the largest resource amount.

Next, in step S5, the unprocessed route check unit 28 judges whether or not there is any transmission/reception route selection left for another route pair, based on the communication request, but it is assumed here that it has been judged that there is no transmission/reception route selection left (No). This completes selecting the shared 3R on the third route.

<Determining Required Resource Amount of Shared 3R>

Next, operation of determining the resource amount (the transmission capability of numbers of wavelengths) required for the shared 3R 8*b* selected by the selecting is described with reference to the flowchart shown in FIG. 8.

Figure 8:
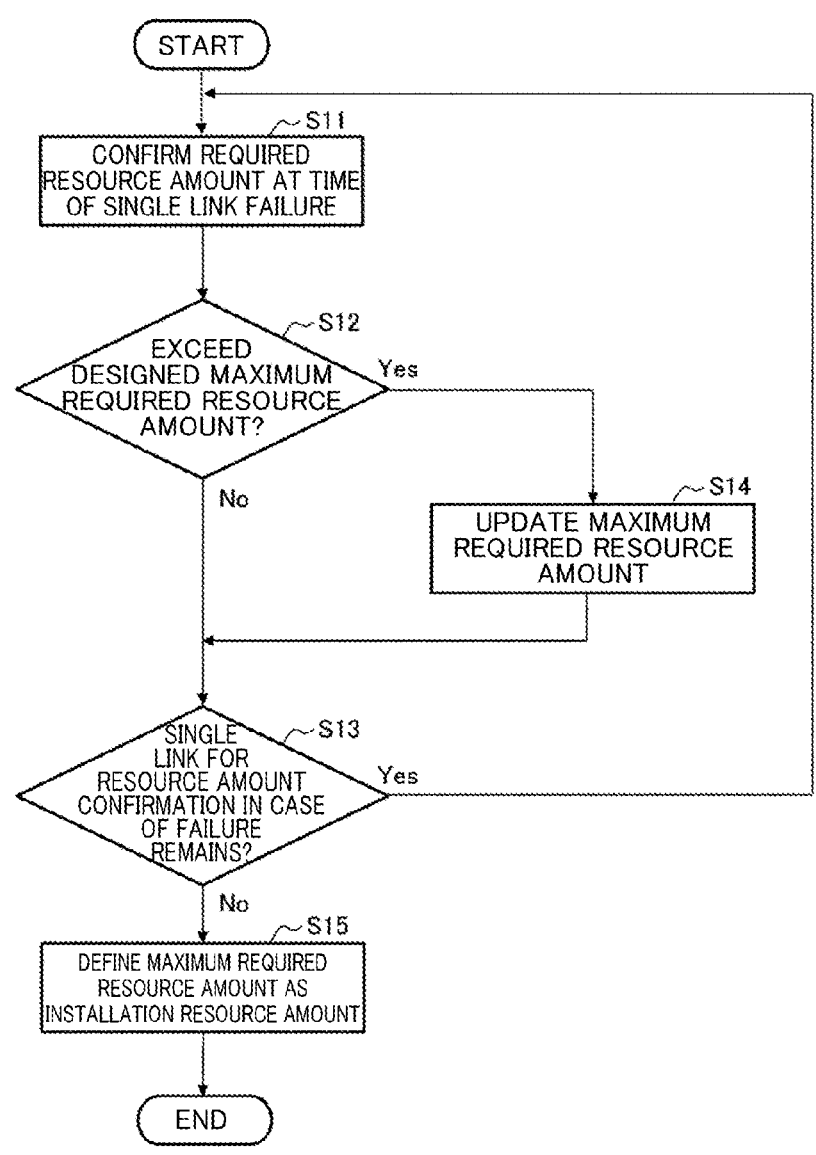
FIG. 8 is a flowchart to illustrate operation of determining a resource amount required for a shared 3R selected in the optical path route design process according to the first embodiment.

In step S11 shown in FIG. 8, the required resource amount confirmation unit 25 shown in FIG. 1 selects one of unitary routes of the system-1 route 1*a*, the system-0 routes 0*b* and 0*c* of the first to third route pairs 01*a*, 01*b* and 01*c* shown in FIGS. 4 to 6, and confirms the required resource amount at the shared 3R on the third route at a failure of the selected unitary link such as the failures 11 and 12.

For example, it is assumed that the failure 11 has occurred on the system-1 route 1*a* of the first route pair 01*a* (FIG. 4), which uses 10 wavelengths. In this case, since the other second and third route pairs 01*b* and 01*c* (FIG. 5 and FIG. 6) have no system-0 route and system-1 route including the unitary link having the failure 11, only the third route 3*a* of the first route pair 01*a* requires 10 wavelengths. Based on the confirmation results, the confirmation unit 25 confirms that the resource amount as capability of transmitting the optical signal of 10 wavelengths is required at the shared 3R 8*b* of the third route 3*a* at the time of the failure 11 on the system-1 route 1*a*.

Next, in step S12, the resource amount judgement unit 26 judges whether or not the resource amount confirmed in step S11 exceeds the maximum required resource amount on design set in the shared 3R 8*b*.

As a judgement result, when it is judged as being equal to or less than the maximum required resource amount (No), the unprocessed route check unit 28 checks in step S13 (judges) whether or not there is any unitary link of the route pairs left for resource amount confirmation at the time of failure in step S11. It is assumed that there is a unitary link, having the failure 12 in FIGS. 5 and 6, of the system-0 routes 0b and 0c of the second and third route pairs 01b and 01c left for resource amount confirmation.

In this case, the processing returns to step S11, and the confirmation unit 25 selects a unitary link, corresponding to the failure 12, of the system-0 routes 0b and 0c of the second and third route pairs 01b and 01c, and confirms that the resource amount of 20 wavelengths (10 wavelengths+10 wavelengths) is required for the shared 3R 8b of the third routes 3b and 3c at the failure 12 on the system-0 route 0b and the system-0 route 0c.

After the requirement of 20 wavelengths is confirmed, the resource amount judgement unit 26 judges in step S12 as exceeding the maximum required resource amount (10 wavelengths) set in the shared 3R 8b (Yes).

In this case, in step S14, the resource amount update unit 27 updates the maximum required resource amount set in the shared 3R 8b from 10 wavelengths to 20 wavelengths.

Next, it is assumed that the unprocessed route check unit 28 has confirmed in step S13 that there is no unitary link left for resource amount confirmation in step S11 in case of failure.

In this case, in step S15, the maximum resource amount determination unit 29 determines that the maximum required resource amount of 20 wavelengths updated in step S14 is the resource amount of the shared 3R 8b.

Advantageous Effects of First Embodiment

Advantageous effects of the optical path route design device 20A according to the first embodiment of the present invention is described.

1a) The optical path route design device 20A shown in FIG. 1 includes the transmission/reception route selection unit 20, the candidate selection unit 21, the existence judgement unit 22, the new 3R selection unit 24, and the maximum resource 3R selection unit 23.

As shown in FIGS. 4 to 6, the transmission/reception route selection unit 20 selects the relay stations 9, in which two transmission/reception end points are arranged to transmit and receive optical signals, from a plurality of the relay stations 9 connected to each other via the optical transmission lines and relaying the optical signals, connects the transmission/reception end points with each other, and selects the route pair 01a of the active system-0 route 0a and the standby system-1 route 1a, which do not overlap with each other, and the backup third route 3a detouring from the route pair 01a via the relay stations 9.

The candidate selection unit 21 selects the relay stations 9 scattered on the selected third route 3a as candidates in which 3R-capable units (3Rs 8b, 8c and 8d and 3Rs 8a, 8b and 8e) to relay the optical signals of a predetermined wavelengths are arranged.

The existence judgement unit 22 judges whether or not there is a shared 3R-capable unit in the selected candidate.

The new 3R selection unit 24 newly selects a shared 3R-capable unit from the candidate shared 3R-capable units when the existence judgement unit 22 has judged as being non-existent.

The maximum resource 3R selection unit 23 is configured to select one shared 3R-capable unit when the existence judgement unit 22 has judged as being existent and there is one existing shared 3R-capable unit, and select a shared 3R-capable unit having the largest number of wavelengths as the resource amount of communication when there is a plurality of existing shared 3R-capable units.

According to this configuration, when the route pair 01a of the active system-0 route 0a and the standby system-1 route 1a, and the backup third route 3a detouring from the route pair 01a are laid to implement a three-route structure, the shared 3R-capable unit shared by the third routes 3a and 3b can be selected from a new or existing shared 3R-capable unit for the different route pair 01b. That is, the shared 3R-capable unit shared by the third routes 3a and 3b is easily provided without having the third routes 3a and 3b individually provided with the 3R-capable units. Thus, costs of installing the third routes 3a and 3b are reduced.

2a) The transmission/reception route selection unit 20 further includes the required resource amount confirmation unit 25, the resource amount update unit 27, and the maximum resource amount determination unit 29 shown in FIG. 1.

The required resource amount confirmation unit 25 confirms the resource amount required for the shared 3R-capable unit on the third route for the route pair when a unitary link of the system-0 route or the system-1 route of the route pair has failed. When the confirmed resource amount exceeds the maximum required resource amount set in the shared 3R-capable unit, the resource amount update unit 27 updates the resource amount of the shared 3R-capable unit with the confirmed resource amount. The maximum resource amount determination unit 29 determines the confirmed resource amount as the maximum required resource amount of the shared 3R-capable unit when the update has not been performed, and determines the updated resource amount as the maximum required resource amount of the shared 3R-capable unit when the update has been performed.

The resource amount required for the shared 3R-capable unit is the number of wavelengths of the optical signal to be transmitted to the failed unitary link, and, when a plurality of different route pairs have a common unitary link in failure, is the number of wavelengths obtained by adding the number of wavelengths of the optical signal to be transmitted to the common unitary link in failure.

According to this configuration, the following advantageous effects are obtained. It is assumed that a first failure has occurred only at a unitary link of the system-1 route of the first route pair 01a, where the system-1 route is used for 10 wavelengths, for example. In this case, a resource amount of 10 wavelengths is required for a specific shared 3R-capable unit on the third route 3a for the first route pair 01a. On the other hand, it is assumed that a second failure has occurred at a common unitary link of the system-0 routes of the second and third route pairs 01b and 01c, where each of the system-0 routes is used for 10 wavelengths.

In this case, the specific shared 3R-capable unit on the third routes 3b and 3c of the second and third route pairs 01b and 01c requires a resource amount of 20 wavelengths obtained by adding respective 10 wavelengths (10+10) for transmission on the third routes 01b and 01c at the time of the second failure. In this way, the specific shared 3R-capable unit shared by the three third routes 01a, 01b and 01c requires 10 wavelengths at the time of the first failure and 20 wavelengths at the time of the second failure, but the minimum required resource amount of 20 wavelengths is enough instead of 30 (10+20) wavelengths. Thus, costs of installing the third routes 01*a*, 01*b* and 01*c* are reduced.

Configuration of Second Embodiment

Figure 9:
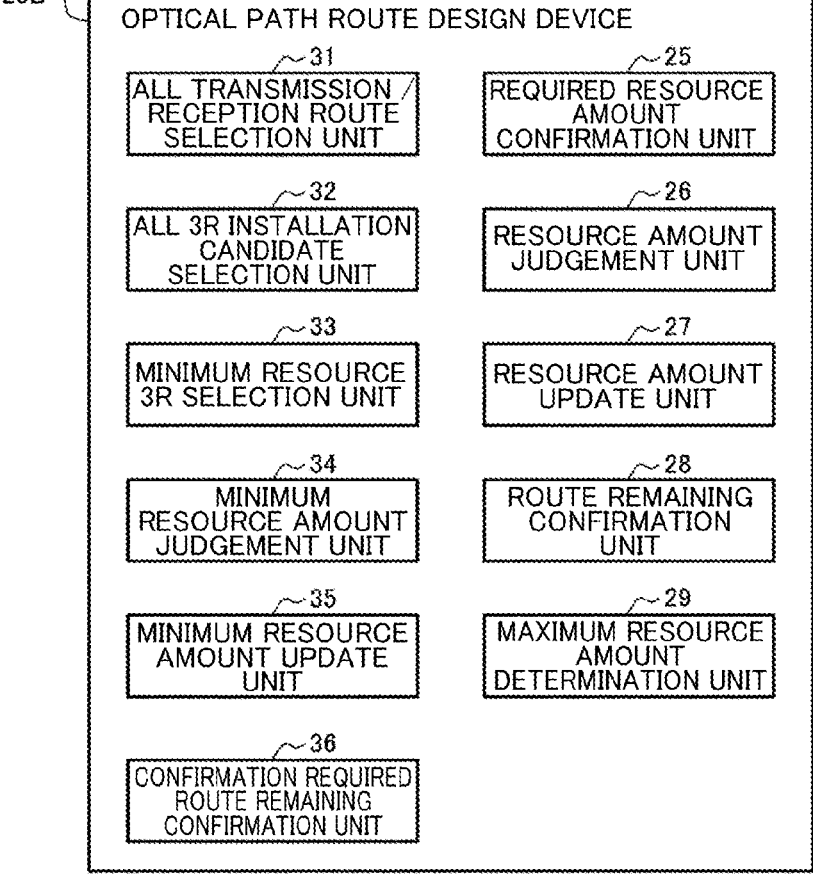
FIG. 9 is a block diagram showing a configuration of an optical path route design device according to a second embodiment of the present invention.

FIG. 9 is a block diagram showing a configuration of an optical path route design device according to a second embodiment of the present invention.

An optical path route design device 20B of the second embodiment shown in FIG. 9 selects a 3R with the minimum resource amount from among 3Rs (3R relay devices) 8*a* and 8*c* shared by the third routes 3*a* and 3*b* as shown in FIG. 2.

The design device 20B of the second embodiment shown in FIG. 9 includes an all transmission/reception route selection unit 31, an all 3R installation candidate selection unit 32, a minimum resource 3R selection unit 33, a minimum resource amount judgement unit 34, a minimum resource amount update unit 35, and an unprocessed confirmation-required route check unit 36, and further includes the required resource amount confirmation unit 25, the resource amount judgement unit 26, the resource amount update unit 27, the unprocessed route check unit 28 and the maximum resource amount determination unit 29, as with the design device 20A (FIG. 1) of the first embodiment.

Figure 10:
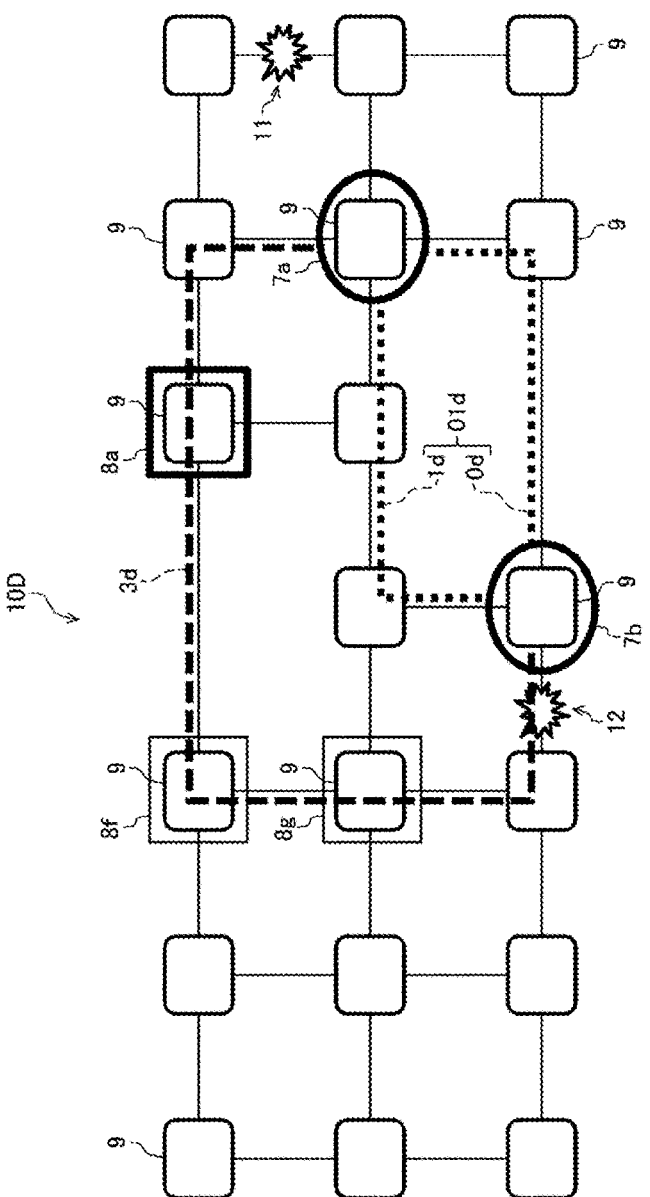
FIG. 10 is a configuration diagram showing an example of an optical network.

The all transmission/reception route selection unit 31 selects transmission/reception end points, a system-0 route, a system-1 route and a third route in all optical networks 10B, 10C and 10D shown in FIGS. 5, 6 and 10, for example, where transmission/reception demand is confirmed at the present time.

Note, however, that it is assumed that the request has been made in the optical network 10D in FIG. 10 after the transmission/reception request in the optical networks 10A and 10B. In the optical network 10D, a plurality of the relay stations 9 are connected via the optical transmission lines, as with the optical network 10A (FIG. 4), and transponders (transmission/reception end points) 7*a* and 7*b* are arranged in the two relay stations 9 different from those in the optical networks 10A and 10B (FIG. 5).

The transmission/reception end points 7*a* and 7*b* are connected with each other by a system-0 route 0*d* and a system-1 route 1*d*, and connected by a third route 3*d* detouring from a route pair (fourth route pair) 01*d* of the system-0 route 0*d* and system-1 route 1*d*. The third route 3*d* includes the three relay stations 9 separated from each other, which are candidates in which 3Rs 8*a*, 8*f* and 8*g* are arranged.

Here, it is assumed that the design device 20A of the first embodiment shown in FIG. 1 has selected the 3Rs 8*a*, 8*b* and 8*e* on the third route 3*b* of the second route pair 01*b* (FIG. 5), and then has selected the 3Rs 8*a*, 8*b* and Be on the third route 3*c* of the third route pair 01*c* (FIG. 6). Since the 3Rs 8*a*, 8*b* and 8*e* of both the second and third route pairs 01*b* and 01*c* are candidates for a shared 3R, it is assumed that, for example, the 3R 8*b* has been selected as the shared 3R.

However, it is assumed that the 3Rs 8*a*, 8*f* and 8*g* on the third route 3*d* of the fourth route pair 01*d* have been selected later in response to a new transmission/reception request. In this case, since the 3R 8*b* already selected for both the second and third route pairs 01*b* and 01*c* is not included in the 3Rs 8*a*, 8*f* and 8*g*, the 3R 8*b* does not work as a shared 3R of the three route pairs 01*b*, 01*c* and 01*d*.

Therefore, the design device 20B of the second embodiment selects the shared 3R of all the three route pairs 01*b*, 01*c* and 01*d* as follows. That is, the all transmission/reception route selection unit 31 (selection unit 31) selects transmission/reception end points, a system-0 route, a system-1 route and a third route in each of all the optical networks 10B, 10C and 10D.

That is, the selection unit 31 selects the relay stations 9 in which the two transmission/reception end points 5*a* and 5*b* shown in FIG. 5 are arranged, selects the system-0 route 0*b* and the system-1 route 1*b* which connect the transmission/reception end points 5*a* and 5*b* with each other and do not overlap with each other, and selects the third route 3*b* which does not overlap with the route pair 01*b*. Additionally, the selection unit 31 selects the relay stations 9 scattered on the third route 3*b* as candidates in which the 3Rs 8*a*, 8*b* and 8*e* are arranged.

In addition, the selection unit 31 selects the relay stations 9 in which the two transmission/reception end points 6*a* and 6*b* shown in FIG. 6 are arranged, selects the system-0 route 0*c* and the system-1 route 1*c* which connect the transmission/reception end points 6*a* and 6*b* with each other and do not overlap with each other, and selects the third route 3*c* which does not overlap with the route pair 01*c*. Additionally, the selection unit 31 selects the relay stations 9 scattered on the third route 3*c* as candidates in which the 3Rs 8*a*, 8*b* and 8*e* are arranged.

Further, the selection unit 31 selects the relay stations 9 in which the two transmission/reception end points 7*a* and 7*b* shown in FIG. 10 are arranged, selects the system-0 route 0*d* and the system-1 route 1*d* which connect the transmission/reception end points 7*a* and 7*b* with each other and do not overlap with each other, and selects the third route 3*d* which does not overlap with the route pair 01*d*. Additionally, the selection unit 31 selects the relay stations 9 scattered on the third route 3*d* as candidates in which the 3Rs 8*a*, 8*f* and 8*g* are arranged.

The all 3R installation candidate selection unit 32 (also referred to as all candidate selection unit 32) shown in FIG. 9 selects a shared 3R (for example, the 3R 8*a*) shared by all the third route 3*b*, 3*c* and 3*d* from among the 3Rs 8*a*, 8*b* and 8*e* (FIG. 5) on the third route 3*b*, the 3Rs 8*a*, 8*b* and 8*e* (FIG. 6) on the third route 3*c*, and the 3Rs 8*a*, 8*f* and 8*g* (FIG. 10) on the third route 3*d*, as all candidates selected by the selection unit 31.

Here, the design device 20B confirm the resource amount (for example, 20 wavelengths) of the shared 3R selected by the all candidate selection unit 32, using the required resource amount confirmation unit 25, the resource amount judgement unit 26, the resource amount update unit 27, the unprocessed route check unit 28 and the maximum resource amount determination unit 29, which are described in the first embodiment. Note, however, that the required resource amount confirmation unit 25, the resource amount judgement unit 26, the resource amount update unit 27, the unprocessed route check unit 28 and the maximum resource amount determination unit 29 are collectively referred to as a shared 3R resource amount confirmation unit.

The minimum resource amount judgement unit 34 (judgement unit 34) judges whether or not the confirmed resource amount is less than the minimum required resource amount already designed and set in the shared 3R.

When the judgement unit 34 has judged as being less than the minimum required resource amount, the minimum resource amount update unit 35 updates the minimum resource amount to be set in the shared 3R with the confirmed resource amount (for example, 20 wavelength).

When the judgement unit 34 has judged as being equal to or greater than the minimum required resource amount or when the update unit 35 has updated the minimum resource amount, the unprocessed confirmation-required route check unit 36 (check unit 36) confirms whether or not there is any arrangement pattern of the shared 3R left for resource amount confirmation by the shared 3R resource amount confirmation unit. As a result, when there is at least one left, the resource amount is confirmed by the shared 3R resource amount confirmation unit.

The minimum resource 3R selection unit 33 selects the shared 3R, with the minimum resource amount, from among the shared 3Rs.

Operations of Second Embodiment

Next, operation of selecting the shared 3R on the third route in designing an optical path route by the optical path route design device 20B according to the second embodiment is described with reference to a flowchart in FIG. 11.

Figure 11:
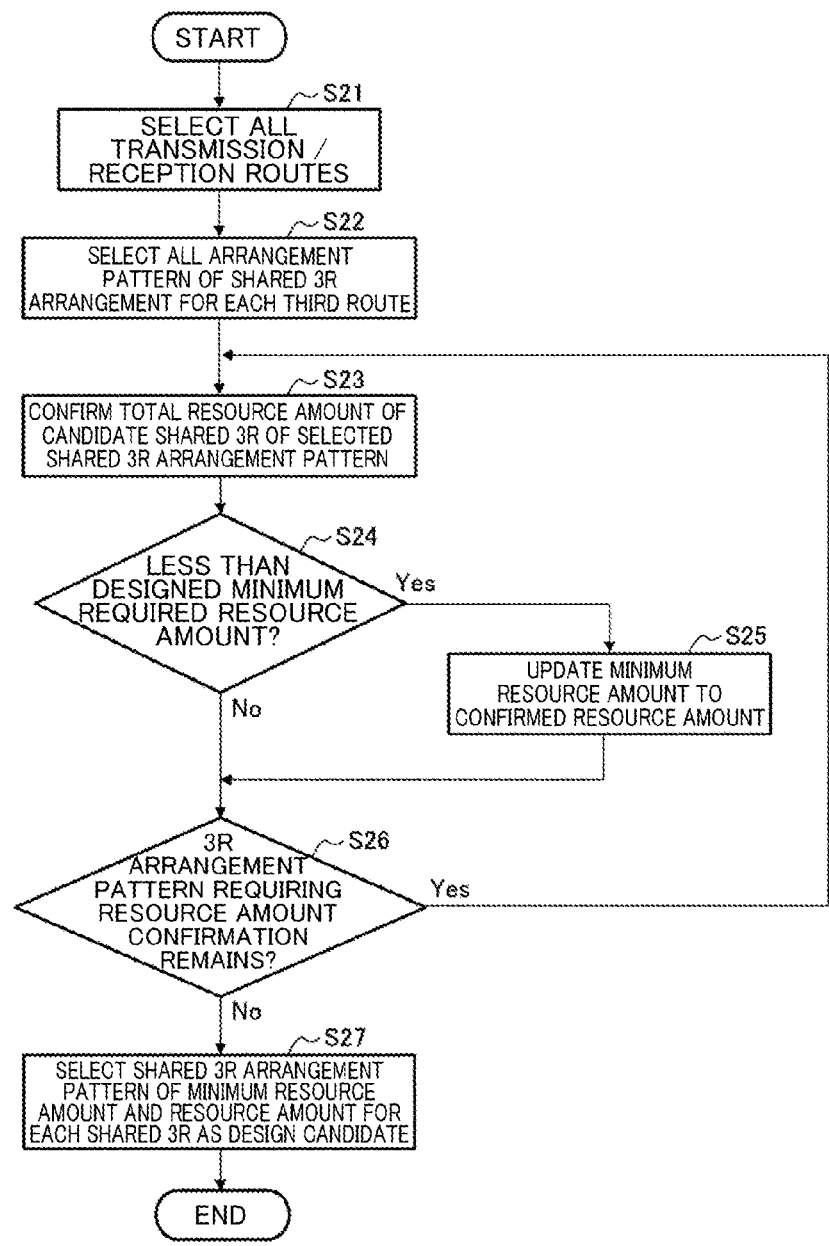
FIG. 11 is a flowchart to illustrate an optical path route design process by the optical path route design device according to the second embodiment.

In step S21 in FIG. 11, the all transmission/reception route selection unit 31 in FIG. 9 selects transmission/reception routes of all the optical networks which are recognized to have transmission/reception demand.

For example, the selection unit 31 selects the transmission/reception end points 5a and 5b, the system-0 route 0b, the system-1 route 1b, and the third route 3b shown in FIG. 5, and selects the 3Rs 8a, 8b and 8e, arranged in the relay stations 9 on the third route 3b, as candidates.

In addition, the selection unit 31 selects the transmission/reception end points 6a and 6b, the system-0 route 0c, the system-1 route 1c, and the third route 3c shown in FIG. 6, and selects the 3Rs 8a, 8b and 8e, arranged in the relay stations 9 on the third route 3c, as candidates.

Further, the selection unit 31 selects the transmission/reception end points 7a and 7b, the system-0 route 0d, the system-1 route 1d, and the third route 3d shown in FIG. 10, and selects the 3Rs 8a, 8f and 8g, arranged in the relay stations 9 on the third route 3d, as candidates.

Next, in step S22, the all candidate selection unit 32 selects all patterns of shared 3Rs to be arranged for the route pairs from among the 3Rs 8a, 8b and 8e (FIG. 5) on the third route 3b, the 3Rs 8a, 8b and 8e (FIG. 6) on the third route 3c, and the 3Rs 8a, 8f and 8g (FIG. 10) on the third route 3d of all the selected candidates. For example, the pattern may be one in which a shared 3R is arranged in the 3R 8a for all the third routes 3b, 3c and 3d. As another pattern, for example, the pattern may be one in which a shared 3R is arranged in the 3R 8a for the third route 3b, a shared 3R is arranged in the 3R 8b for the third route 3c, and a shared 3R is arranged in the 3R 8f for the third route 3d.

In step S23, the shared 3R resource amount confirmation unit (the required resource amount confirmation unit 25, the resource amount judgement unit 26, the resource amount update unit 27, the unprocessed route check unit 28 and the maximum resource amount determination unit 29) confirms the resource amount of the 3R arrangement pattern selected in step S22 (for example, 20 wavelengths of a pattern in which a shared 3R is arranged in the 3R 8a for all the third routes 3b, 3c and 3d). This confirmation is performed as in the processing in steps S11 to S15 (FIG. 8).

Note, however, that the resource amount in the shared 3R determined by the maximum resource amount determination unit 29 is confirmed in step S15. In this example, since the resource amount is confirmed for each arrangement pattern of the shared 3R, the resource amount of each shared 3R arrangement pattern is confirmed in a loop returning from step S26, to be described below, to step S23, until all the arrangement patterns are confirmed.

In step S24, the minimum resource amount judgement unit 34 judges whether or not the confirmed resource amount (20 wavelength) is less than the minimum required resource amount (20 wavelength) of the total resources, which has already been designed and set in the candidate shared 3R of the candidate shared 3R pattern. In this case, it is judged as being equal to or greater than the minimum required resource amount (No), and the processing proceeds to step S26.

In contrast, when the judgement unit 34 has judged in step S24 as being less than the already-designed minimum required resource amount (Yes), the update unit 35 in step S25 update the minimum resource amount, to be set in the shared 3R, with the confirmed resource amount. Then, the processing proceeds to step S26.

In step S26, when the judgement unit 34 has judged in step S24 as being equal to or greater than the minimum required resource amount (No), or when the update unit 35 has updated the minimum required resource amount in step S25, the check unit 36 confirms whether or not there is an arrangement pattern of the shared 3R left for resource amount confirmation by the shared 3R resource amount confirmation unit. As a result, when there is at least one left (Yes), the processing returns to step S23 and the resource amount is confirmed by the shared 3R resource amount confirmation unit.

When there is none left (No), the minimum resource 3R selection unit 33 in step S27 selects a shared 3R arrangement pattern with the minimum resource amount from among the shared 3Rs and the resource amount of the 3Rs as design candidates, but since the total resource amount of the candidate 3R is minimum (20 wavelengths) in a pattern of selecting the shared 3R 8a for all the third routes 3b, 3c and 3d, arranging the resource amount of 20 wavelengths at the shared 3R 8a is selected as a design candidate.

Advantageous Effects of Second Embodiment

Advantageous effects of the optical path route design device 20B according to the second embodiment of the present invention is described.

The optical path route design device 20B shown in FIG. 9 includes the all transmission/reception route selection unit 31, the all candidate selection unit 32, the shared 3R resource amount confirmation unit (the required resource amount confirmation unit 25, the resource amount judgement unit 26, the resource amount update unit 27, the unprocessed route check unit 28, and the maximum resource amount determination unit 29), the minimum resource amount update unit (update unit) 35, and the minimum resource 3R selection unit 33.

As shown in FIG. 5, the all transmission/reception route selection unit 31 executes processing for the optical network 1 of selecting the relay stations 9, in which two transmission/reception end devices (transmission/reception end points) to transmit/receive optical signals with each other are arranged, from among a plurality of the relay stations 9 connected to each other through optical transmission lines and relaying the optical signals, selecting the route pair 01b of the active system-0 route 0b and the standby system-1 route 1b, which connect the transmission/reception end devices with each other and do not overlap with each other, and the backup third route 3b detouring from the route pair 01b via the one or more relay stations 9, and selecting the relay stations 9 scattered on the selected third route 3b as candidates in which 3R-capable units (3Rs 8a, 8b and 8e) to relay optical signals of the predetermined number of wavelengths are arranged, for optical networks 10B, 10C and 10D (FIG. 5, FIG. 6 and FIG. 10).

The all candidate selection unit 32 selects all the candidate arrangement patterns of the shared 3R-capable units selected for all the third routes 3*b*, 3*c* and 3*d* from among the candidate 3R-capable units on all the third routes 3*b*, 3*c* and 3*d* selected in the optical networks 10B, 10C and 10D.

The shared 3R resource amount confirmation unit confirms the resource amount for each candidate arrangement pattern of the shared 3R-capable units selected by the all candidate selection unit 32.

When the resource amount confirmed by the shared 3R resource amount confirming unit is less than the designed minimum required resource amount of the total resource amount of all the 3R-capable units selected as the candidate shared 3R arrangement pattern, the minimum resource amount update unit 35 updates the minimum resource amount to be set in the shared 3R-capable unit with the confirmed resource amount.

The minimum resource 3R selection unit 33 selects the arrangement pattern of the shared 3R-capable unit having the minimum resource amount, updated by the minimum resource amount update unit 35, and the required resource amount of the 3R-capable units, as design candidates, from among the total required 3R resources for the arrangement patterns of the shared 3R-capable units whose resource amount has been confirmed by the shared 3R resource amount confirmation unit.

According to this configuration, when the route pair 01*b* of the active system-0 route 0*b* and the standby system-1 route 1*b*, and the backup third route 3*b* detouring from the route pair 01*b* are laid to implement a three-route structure, the shared 3R-capable unit (3R 8*a*) having the minimum resource amount can be selected from among the shared 3R-capable units shared by the third routes 3*b*, 3*c* and 3*d* for the different route pairs 01*b*, 01*c* and 01*d*. That is, since the shared 3R-capable unit (3R 8*a*) having the minimum resource amount can be selected as a design candidate, costs of installing the third routes 3*b*, 3*c* and 3*d* are reduced.

Configuration of Third Embodiment

Figure 12:
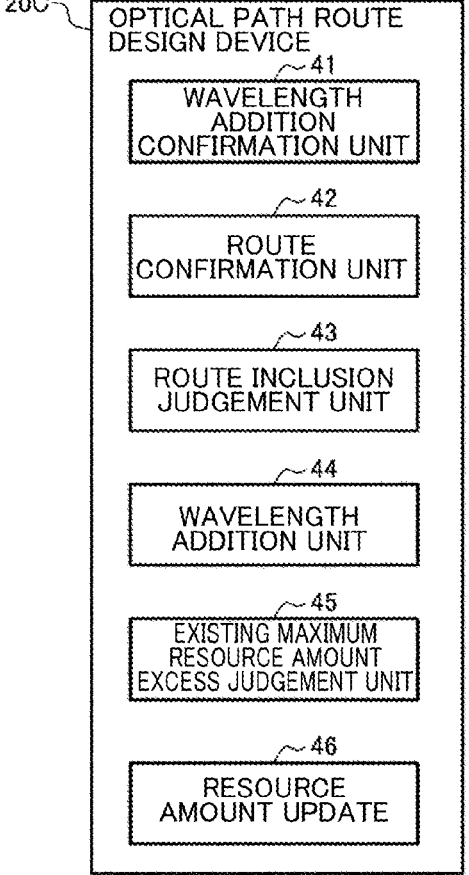
FIG. 12 is a block diagram showing a configuration of an optical path route design device according to a third embodiment of the present invention.

FIG. 12 is a block diagram showing a configuration of an optical path route design device according to a third embodiment of the present invention.

An optical path route design device 20C of the third embodiment shown in FIG. 12 increases the resource amount of the shared 3R when some number of wavelengths (resource amount) is added to the route pair, after the design of selecting the shared 3R on the third route for the route pair by the optical path route design device 20A (FIG. 1) and the optical path route design device 20B (FIG. 9) has been completed.

The design device 20C of the third embodiment shown in FIG. 12 includes a wavelength addition confirmation unit 41, a route confirmation unit 42, a route inclusion judgement unit 43, a wavelength addition unit 44, an existing maximum resource amount exceedance judgement unit 45, and a resource amount update unit 46. The design device 20C may be added to the design device 20A or 20B or may be independent.

Figure 13:
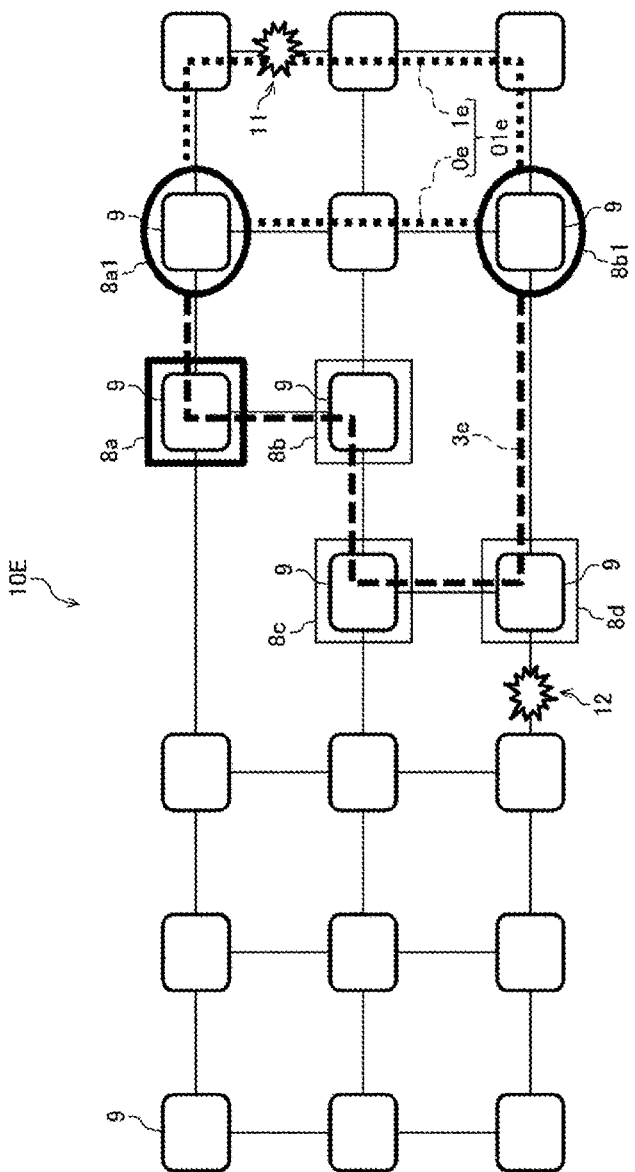
FIG. 13 is a configuration diagram showing an example of an optical network.

Here, in an optical network 10E shown in FIG. 13, a plurality of the relay stations 9 is connected by optical transmission lines, as with the optical network 10A (FIG. 4), and transponders (transmission/reception end points) 8*a*1 and 8*b*1 are arranged in the two relay stations 9. The transmission/reception end points 8*a*1 and 8*b*1 are connected with each other by a system-0 route de and a system-1 route 1*e*, and are connected by a third route 3*e* detouring to a remote position away from a route pair (fifth route pair) 01*e*. The third route 3*e* connects the end points with each other via the four relay stations 9 away from each other, as candidates in which the 3Rs 8*a*, 8*b*, 8*c* and 8*d* are arranged.

Figure 14:
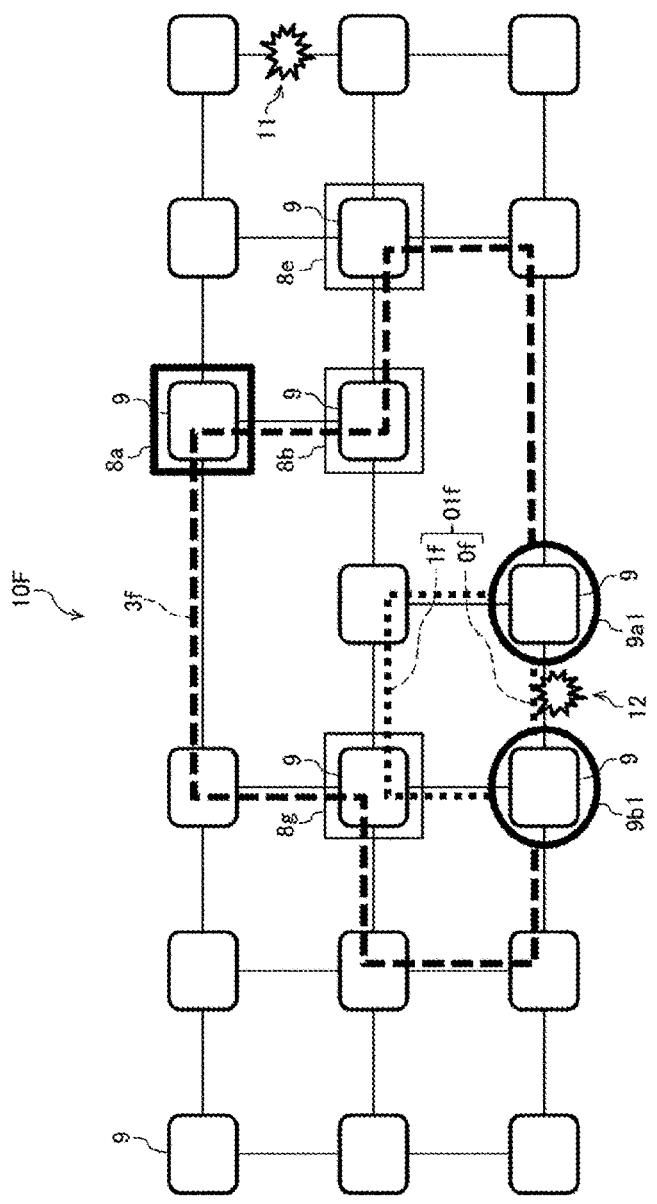
FIG. 14 is a configuration diagram showing an example of the optical transmission network.

In an optical network 10F shown in FIG. 14, a plurality of the relay stations 9 is connected by optical transmission lines in the same manner as described above, and transponders (transmission/reception end points) 9*a*1 and 9*b*1 are arranged in the two relay stations 9. The transmission/reception end points 9*a*1 and 9*b*1 are connected with each other by a system-0 route 0*f* and a system-1 route 1*f*, and connected by a third route 3*f* detouring to a remote position from a route pair (sixth route pair) 01*f*. The third route 3*f* connects the end points with each other via the four relay stations 9 as candidates in which the 3Rs 8*a*, 8*b*, 8*e* and 8*g* are arranged.

Here, it is assumed that the shared 3R 8*a* arranged in the relay station 9 on the third route 3*e* for the fifth route pair 01*e* shown in FIG. 13 has been selected. It is assumed that the shared 3R 8*a* has the resource amount of 10 wavelengths to be transmitted at the time of the failure 11 on the system-1 route 1*e* of the fifth route pair 01*e*.

The wavelength addition confirmation unit 41 (FIG. 12) confirms that wavelengths have been added to the fifth route pair 01*e*. For example, it is confirmed that 15 wavelengths have been added to the system-1 route 1*e*. Since 25 wavelengths (10+15) are transmitted on the system-1 route 1*a* after addition of the wavelengths, the third route 3*e* is required to transmit 25 wavelengths at the time of the failure 11 of a unitary link on the system-1 route 1*e*. Therefore, the shared 3R 8*a* on the third route 3*e* has the resource amount of 25 wavelengths.

The route confirmation unit 42 confirms the maximum resource amount (25 wavelengths) of the shared 3R 8*a* on the third route 3*e* for the route pair 01*e* confirmed, as having wavelengths added, by the wavelength addition confirmation unit 41, and that the failure 12 has occurred, before addition of wavelengths, at a unitary link of the system-0 route 0*f* for which the shared 3R 8*a* has the maximum resource amount (20 wavelengths) as shared with the third route 3*f* for the other route pair 01*f*, requiring transmission of 20 wavelengths. At the time of the failure 12 before addition of the wavelength, since 20 wavelengths are transmitted on the third route 3*f*, the shared 3R 8*a* has the resource amount of 20 wavelengths as the maximum resource amount.

The route inclusion judgement unit 43 judges whether or not the unitary link, having the failure 12 confirmed by the route confirmation unit 42 and requiring the maximum resource amount (20 wavelengths), of the system-0 route 0*f* (FIG. 14) of the route pair 01*f* is included in the system-1 route 1*e* (FIG. 13) of the route pair 01*e*, having wavelengths added (+15 wavelengths).

When the route inclusion judgement unit 43 has judged as being included, the wavelength addition unit 44 adds additional wavelengths of 15 wavelengths to a claimed value (20 wavelengths) for the system-0 route 0*f* requiring the maximum resource of 20 wavelengths, as required resource amount (35 wavelengths: 20+15). The summed 35 wavelengths are the resource amount of the shared 3R 8*a* shared by the third routes 3*e* and 3*f* of the two route pairs 01*e* and 01*f*.

When the route inclusion judgement unit 43 has judged as not being included, the existing maximum resource amount exceedance judgement unit (also referred to as an exceedance judgement unit) 45 judges whether or not there is a case where a failure of a unitary link (for example, the failure 11 of a unitary link) of the system-0 route or the system-1 route of the route pair 01*e*, having wavelengths added (by 15 wavelengths), causes resource amount to exceed the existing maximum resource amount (20 wavelengths). The system-1 route 1*e* transmits the maximum resource amount of 25 (10+15) wavelengths due to addition of wavelengths (by 15 wavelengths).

When the exceedance judgement unit 45 has judged that there is no case, the maximum resource amount (20 wavelengths) confirmed by the route confirmation unit 42 is set as the resource amount of the shared 3R 8*a*.

When the exceedance judgement unit 45 has judged that there is a case, the resource amount update unit 46 updates the resource amount of the shared 3R 8*a* of the third route 3*e*, at the time of the failure 11 on the system-1 route 1*e* requiring the maximum resource amount (25 wavelengths), with 25 wavelengths.

Operations of Third Embodiment

Next, operation of increasing the resource amount of the shared 3R to be performed after completion of design of selecting the shared 3R in designing an optical path route by the optical path route design device 20C according to the third embodiment is described with reference to a flowchart in FIG. 15.

Note, however, that it is assumed that the shared 3R 8*a* arranged in the relay station 9 on the third route 3*e* for the fifth route pair 01*e* shown in FIG. 13 has been selected after completion of design of selecting the shared 3R on the third route for the route pair by the optical path route design device 20A (FIG. 1) and the optical path route design device 20B (FIG. 9). It is assumed that the shared 3R 8*a* has had 10 wavelengths to be transmitted at the time of the failure 11 on the system-1 route 1*e* of the fifth route pair 01*e*, as the resource amount. In addition, it is also assumed that the maximum resource amount transmitted on the system-0 route 0*f* shown in FIG. 14 is 20 wavelengths.

Figure 15:
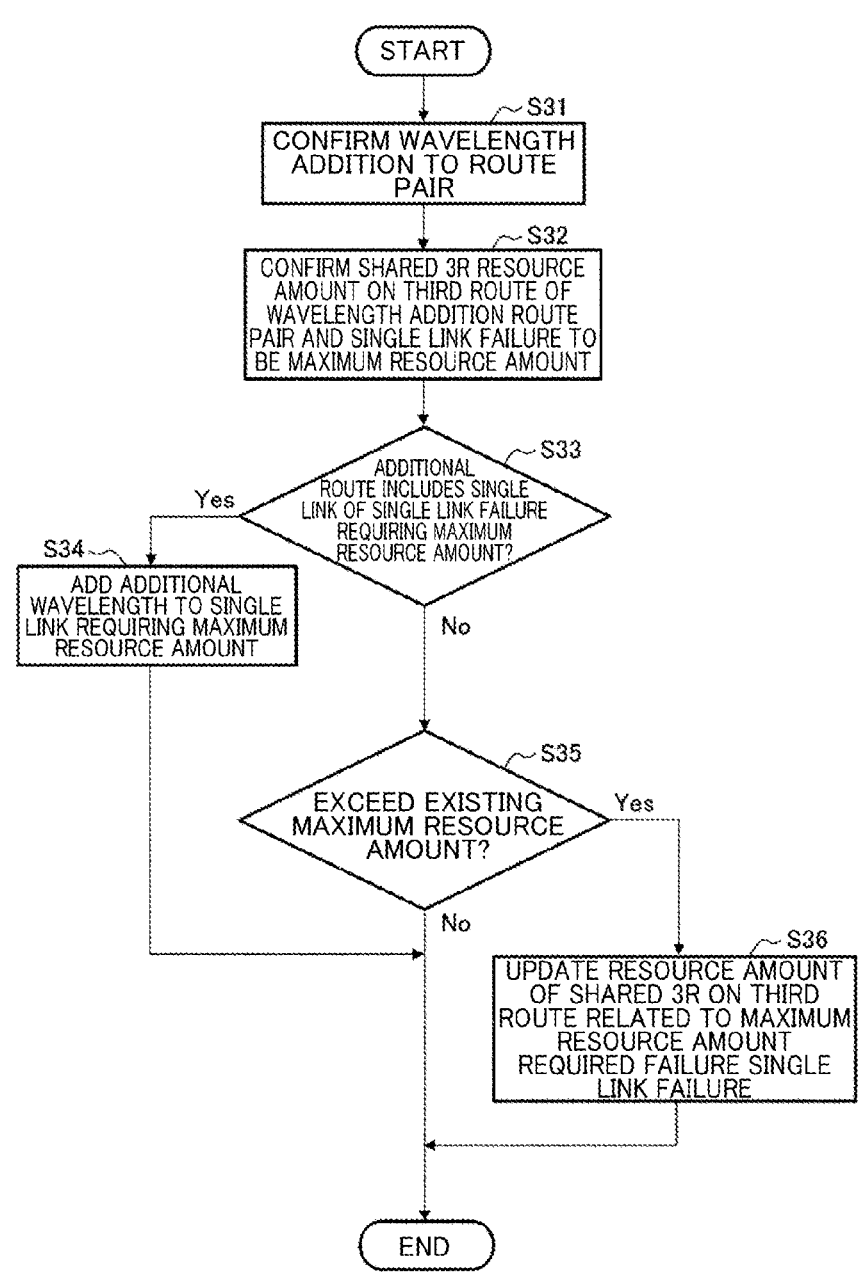
FIG. 15 is a flowchart to illustrate operation of increasing a resource amount of a shared 3R in the optical path route design process by the optical path route design device according to the second embodiment.

In step S31 shown in FIG. 15, the wavelength addition confirmation unit 41 (FIG. 12) confirms that wavelengths have been added to the fifth route pair 01*e*. For example, it is confirmed that 15 wavelengths have been added to the system-1 route 1*e*. Since 25 wavelengths (10+15) are transmitted on the system-1 route 1*a* after addition of the wavelengths, the third route 3*e* is required to transmit 25 wavelengths at the time of the failure 11 of a unitary link on the system-1 route 1*e*. Therefore, the shared 3R 8*a* on the third route 3*e* has the resource amount of 25 wavelengths.

In step S32, the route confirmation unit 42 confirms the maximum resource amount (25 wavelengths) of the shared 3R 8*a* on the third route 3*e* for the route pair 01*e* (FIG. 13) confirmed, as having wavelengths added, in step S31. Further, the route confirmation unit 42 confirms that a failure has occurred, before addition of wavelengths, at a unitary link for which the shared 3R 8*a* has the maximum resource amount (20 wavelengths) as shared with the third route 3*f* for the other route pair 01*f* (FIG. 14) requiring transmission of 20 wavelengths.

In step S33, the route inclusion judgement unit 43 judges whether or not the unitary link, requiring the maximum resource amount (20 wavelengths) and having a failure confirmed in step S32, is included in the system-1 route 1*e* of the route pair 01*e*, having wavelengths added (+15 wavelengths).

When it has been judged, as a result of the judgement, as being included (Yes), the wavelength addition unit 44 in step S34 adds additional wavelengths of 15 wavelengths to a claimed value (20 wavelengths) for the unitary link, having a failure and requiring the maximum resource amount (20 wavelengths), as required resource amount (35 wavelengths: 20+15). The summed 35 wavelengths are the resource amount of the shared 3R 8*a* shared by the third routes 3*e* and 3*f* of the two route pairs 01*e* and 01*f*. This completes increasing the resource amount.

In contrast, when it has been judged as not being included, as a result of the judgement in step S33, the exceedance judgement unit 45 judges in step S35 whether or not there is a case where a failure of a unitary link (for example, the failure 11 of a unitary link) of the system-0 or the system-1 route of the route pair 01*e*, having wavelengths added (by 15 wavelengths), causes resource amount to exceed the existing maximum resource amount (20 wavelengths). Note, however, that the system-1 route 1*e* transmits the maximum resource amount of 25 (10+15) wavelengths due to addition of wavelengths (by 15 wavelengths).

When it has been judged as a result of the judgement that there is no case (No), the maximum resource amount (20 wavelengths) confirmed in step S32 by the route confirmation unit 42 is set as the resource amount of the shared 3R 8*a*, and this completes increasing the resource amount.

In contrast, when it has been judged as a result of the judgement that there is a case (Yes), the resource amount update unit 46 in step S36 updates the resource amount of the shared 3R 8*a* on the third route 3*e* for the system-1 route 1*e*, at the time of the failure 11 on a unitary link requiring the maximum resource amount (25 wavelengths), with 25 wavelengths. This completes increasing the resource amount.

Advantageous Effects of Third Embodiment

Advantageous effects of the optical path route design device 20C according to the third embodiment of the present invention is described.

The optical path route design device 20C shown in FIG. 12 includes the wavelength addition confirmation unit 41, the route confirmation unit 42, the route inclusion judgement unit 43, the wavelength addition unit 44, the exceedance judgement unit (existing maximum resource amount exceedance judgement unit) 45, and the resource amount update unit 46.

The wavelength addition confirmation unit 41 confirms that wavelengths have been added (by 15 wavelengths) to the route pair 01*e* shown in FIG. 13.

The route confirmation unit 42 confirms the maximum resource amount (25 wavelengths) of the shared 3R-capable unit (e.g., 3R 8*a*) on the third route 3*e* for the route pair 01*e* confirmed as having wavelengths added. In addition, the route confirmation unit 42 confirms the unitary link in failure for which the shared 3R 8*a* has the maximum resource amount (20 wavelengths) before addition of the wavelengths, as shared with the third route 3*f* for the other route pair 01*f* (FIG. 14) requiring transmission of 20 wavelengths.

The route inclusion judgement unit 43 judges whether or not the unitary link, requiring the maximum resource amount (20 wavelengths) and having a failure confirmed by the route confirmation unit 42, is included in the route pair 01*e* having wavelengths added.

When the route inclusion judgement unit 43 has judged as being included, the wavelength addition unit 44 adds the resource amount of additional wavelengths (+15 wavelengths) to the maximum resource amount of the unitary link requiring the maximum resource amount (20 wavelengths) (to have 35 wavelengths).

When the route inclusion judgement unit 43 has judged as not being included and the route pair 01*e*, having wavelengths added, has failed, the exceedance judgement unit 45 judges whether or not a resource amount exceeds the existing maximum resource amount (20 wavelengths). When it has been judged as not exceeding said amount, the maximum resource amount (20 wavelengths) before addition of the wavelengths, confirmed by the route confirmation unit 42, is set as the resource amount of the shared 3R-capable unit (3R 8*a*).

When the exceedance judgement unit 45 has judged that there is a case, the resource amount update unit 46 updates the resource amount of the shared 3R-capable unit (3R 8*a*) with the maximum resource amount (25 wavelengths) confirmed by the route confirmation unit 42.

According to this configuration, when wavelengths (the resource amount) are added to the route pair 01*e* after completion of the design of selecting the shared 3R-capable unit on the third route 3*e* for the route pair 01*e* by the optical path route design devices 20A and 20B, the resource amount of the shared 3R-capable unit is properly increased.

<Hardware Configuration>

Figure 16:
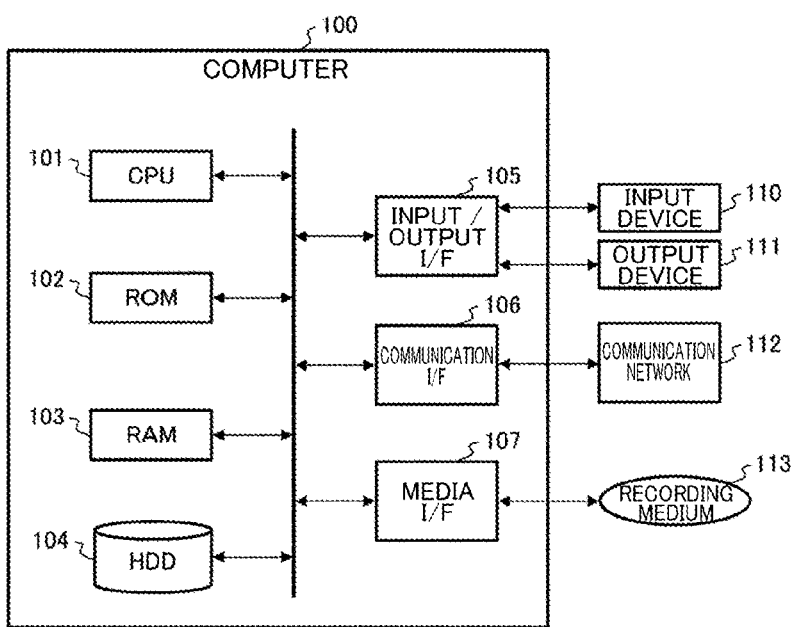
FIG. 16 is a hardware configuration diagram showing an example of a computer to implement functions of the optical path route design device according to each of the first to third embodiments.

Either one of the optical path route design devices 20A, 20B and 20C according to the first to third embodiments is implemented by a computer 100 configured as shown in FIG. 16, for example. The computer 100 includes a Central Processing Unit (CPU) 101, a Read Only Memory (ROM) 102, a Random Access Memory (RAM) 103, a Hard Disk Drive (HDD) 104, an input/output interface (I/F) 105, a communication I/F 106, and a media I/F 107.

The CPU 101 operates on the basis of a program stored in the ROM 102 or the HDD 104, to control functional units. The ROM 102 stores a boot program that is executed by CPU 101 when the computer 100 is started, a program related to hardware of the computer 100, and the like.

The CPU 101 controls an output device 111 such as a printer and a display and an input device 110 such as a mouse and a keyboard through the input/output I/F 105. The CPU 101 acquires data from the input device 110 or outputs generated data to the output device 111 via the input/output I/F 105.

The HDD 104 stores a program that is executed by the CPU 101, data that is used by the program, and the like. The communication I/F 106 receives data from another device (not illustrated) via a communication network 112, delivers the data to the CPU 101, and transmits data generated by the CPU 101 to other devices via the communication network 112.

The media I/F 107 retrieves a program or data stored in a recording medium 113 and delivers the program or data to the CPU 101 via the RAM 103. The CPU 101 loads a program related to intended processing from the recording medium 113 onto the RAM 103 via the media I/F 107, and executes the loaded program. The recording medium 113 is an optical recording medium such as a Digital Versatile Disc (DVD) and a Phase change rewritable Disk (PD), a magneto-optical recording medium such as a Magneto Optical disk (MO), a magnetic recording medium, a conductor memory tape medium, a semiconductor memory, or the like.

For example, when the computer 100 functions as one of the optical path route design devices 20A, 20B and 20C according to the embodiments, the CPU 101 of the computer 100 implements the functions of one of the optical path route design devices 20A, 20B and 20C, by executing one or more programs loaded into the RAM 103. Further, the data in the RAM 103 is stored in the HDD 104. The CPU 101 retrieves a program of intended processing from the recording medium 113 and executes the program. In addition, the CPU 101 may retrieve a program of intended processing from another device via the communication network 112.

Advantageous Effects

1) An optical path route design device is characterized in that the optical path route design device includes: a transmission/reception route selection unit that selects relay stations in which two transmission/reception end devices to transmit/receive optical signals with each other are arranged from among a plurality of relay stations connected to each other through optical transmission lines and relaying the optical signals, connects the transmission/reception end devices with each other, and selects a route pair of an active system-0 route and a standby system-1 route, which do not overlap with each other, and a backup third route detouring from the route pair via one or more relay stations; a candidate selection unit that selects relay stations scattered on the selected third route as candidates in which 3R-capable (3R: Regenerate, Reshape, and Retiming) units to relay optical signals of predetermined wavelengths are arranged; an existence judgement unit that judges whether or not a shared 3R-capable unit exists in the selected candidate; a new 3R selection unit that newly selects a shared 3R-capable unit from among the shared 3R-capable units in the selected candidates, when the existence judgement unit has judged as being non-existent; and a maximum resource 3R selection unit that, when the existence judgement unit has judged as being existent, selects one shared 3R-capable unit if there is one existing shared 3R-capable unit, and selects a shared 3R-capable unit having the maximum number of wavelengths as a resource amount of communication if there is a plurality of existing shared 3R-capable units.

According to this configuration, when a route pair of the active system-0 route and the standby system-1 route and the backup third route detouring from the route pair are laid to implement a three-route structure, the shared 3R-capable unit shared by the third routes can be selected from a new or existing shared 3R-capable unit for the different route pair. That is, the shared 3R-capable unit shared by the third routes is easily provided without having the third routes individually provided with the 3R-capable units. Thus, costs of installing the third routes are reduced.

2) The optical path route design device according to above-described 1) is characterized in that the optical path route design device includes: a required resource amount confirmation unit that confirms the resource amount required for the shared 3R-capable unit on the third route for the route pair when a unitary link of the system-0 route or the system-1 route of the route pair has failed; an update unit that updates the resource amount of the shared 3R-capable unit with the confirmed resource amount, when the confirmed resource amount exceeds the maximum required resource amount set in the shared 3R-capable unit; and a determination unit that determines the confirmed resource amount as the maximum required resource amount of the shared 3R-capable unit when the update has not been performed, and determines the updated resource amount as the maximum required resource amount of the shared 3R-capable unit when the update has been performed, wherein a resource amount required for the shared 3R-capable unit is the number of wavelengths of the optical signals to be transmitted to the failed unitary link and, when the different route pairs have a common unitary link in failure, is the number of wavelengths obtained by adding the number of wavelengths of the optical signals to be transmitted to the common unitary link in failure.

According to this configuration, the following advantageous effects are obtained. It is assumed that a first failure has occurred only at a unitary link of a system-1 route of a first route pair, where the system-1 route is used for 10 wavelengths, for example. In this case, a resource amount of 10 wavelengths is required for a specific shared 3R-capable unit on a third route related for the first route pair. On the other hand, it is assumed that a second failure has occurred at a common unitary link of system-0 routes of second and third route pairs, where each of the system-0 routes is used for 10 wavelengths. In this case, the specific shared 3R-capable unit on the third routes for the second and third route pairs requires a resource amount of 20 wavelengths obtained by adding respective 10 wavelengths (10+10) for transmission on the third routes at the time of the second failure. In this way, the specific shared 3R-capable unit shared by three third routes requires 10 wavelengths at the time of the first failure and 20 wavelengths at the time of the second failure, but the minimum required resource amount of 20 wavelengths is enough instead of 30 (10+20) wavelengths. Therefore, costs of installing the third routes are reduced.

3) An optical path route design device is characterized in that the optical path route design device includes: an all transmission/reception route selection unit that executes processing for an optical network of selecting relay stations in which two transmission/reception end devices to transmit/receive optical signals with each other are arranged, from among a plurality of relay stations connected to each other through optical transmission lines and relaying the optical signals, selecting a route pair of an active system-0 route and a standby system-1 route, which connect the transmission/reception end devices with each other and do not overlap each other, and a backup third route detouring from the route pair via one or more relay stations, and selecting relay stations scattered on the selected third route as candidates in which 3R-capable units to relay optical signals of the predetermined number of wavelengths are arranged, for a plurality of optical networks; an all candidate selection unit that selects all candidate arrangement patterns of shared 3R-capable units as 3R-capable units used for all third routes from among the candidate 3R-capable units on all the third routes selected in the optical networks; a shared 3R resource amount confirmation unit that confirms the total resource amount of the shared 3R resource units for each arrangement pattern of the shared 3R-capable units selected by the all candidate selection unit; a minimum resource amount update unit that updates the minimum resource amount to be set in the shared 3R-capable unit with the confirmed resource amount, when the confirmed resource amount is less than the designed minimum required resource amount of the arrangement pattern set in the shared 3R-capable unit; and a minimum resource 3R selection unit that selects the arrangement pattern of a shared 3R-capable unit having the minimum resource amount and the resource amount of the shared 3R-capable units, as design candidates, from among the arrangement patterns of the shared 3R-capable units whose resource amount has been confirmed by the shared 3R resource amount confirmation unit and the arrangement patterns of the shared 3R-capable unit whose resource amount has been updated by the minimum resource amount update unit.

According to this configuration, when a route pair of an active system-0 route and a standby system-1 route, and a backup third route detouring from the route pair are laid to implement a three-route structure, the shared 3R-capable unit having the minimum resource amount can be selected from among the shared 3R-capable units shared by the third routes for the different route pairs. That is, since the shared 3R-capable unit having the minimum resource amount can be selected as a design candidate, costs of installing the third routes are reduced.

4) The optical path route design device according to any one of above-described 1) to 3) is characterized in that the optical path route design device includes: a wavelength addition confirmation unit that confirms that wavelengths have been added to a route pair; a route confirmation unit that confirms the maximum resource amount of the shared 3R-capable unit on the third route for the route pair confirmed, by the wavelength addition confirmation unit, as having wavelengths added, and confirms a unitary link in failure for which the shared 3R-capable unit has the maximum resource amount before addition of the wavelengths, as shared with the third route for the other route pair; a route inclusion judgement unit that judges whether or not the unitary link, requiring the maximum resource amount and having a failure confirmed by the route confirmation unit, is included in the route pair having wavelengths added; a wavelength addition unit that adds a resource amount of additional wavelengths to the maximum resource amount of the unitary link in failure requiring the maximum resource amount, when the route inclusion judgement unit has judged as being included; an exceedance judgement unit that judges whether or not a resource amount exceeds the existing maximum resource amount when the route inclusion judgement unit has judged as not being included and a unitary link of the route pair having the wavelengths added has failed; and a resource amount update unit that updates the resource amount of the shared 3R-capable unit with the maximum resource amount confirmed by the route confirmation unit, when the exceedance judgement unit has judged that there is a case, wherein when the exceedance judgement unit has judged as not exceeding said amount, the maximum resource amount before addition of the wavelengths, confirmed by the route confirmation unit, is set as the resource amount of the shared 3R-capable unit.

According to this configuration, when wavelengths (the resource amount) are added to the route pair after completion of the design of selecting the shared 3R-capable unit on the third route for the route pair by the optical path route design device, the resource amount of the shared 3R-capable unit is appropriately increased.

In addition, the specific configuration can be appropriately changed without departing from the gist of the present invention.

REFERENCE SIGNS LIST 0a, 0b, 0c, 0d, 0e, 0f system-0 route
1a, 1b, 1c, 1d, 1e, 1f system-1 route
01a, 01b, 01c, 01d, 01e, 01f Route pair
3a, 3b, 3c, 3d, 3e, 3f Third route
8a, 8b, 8d, 8e, 8f, 8g, 8h, 81, 8j, 8e, 8f 3R relay device (3R-capable unit, shared 3R-capable unit)

4*a*, 4*b*, 5*a*, 5*b*, 6*a*, 6*b*, 7*a*, 7*b*, 8*a*1, 8*b*1, 9*a*1, 9*b*1
   Transponder, transmission/reception end point (trans-
   mission/reception end device)
10A, 10B, 10C, 10D, 10E, 10F Optical network
20A, 20B, 20C Optical path route design device
20 Transmission/reception route selection unit
21 3R installation candidate selection unit (Candidate
   selection unit)
22 Existence judgement unit
23 Maximum resource 3R selection unit
24 New 3R selection unit
25 Required resource amount confirmation unit
26 Resource amount judgement unit
27 Resource amount update unit (Update unit)
28 Unprocessed route check unit
29 Maximum resource amount determination unit (Deter-
   mination unit)
31 All transmission/reception route selection unit
32 All 3R installation candidate selection unit
33 Minimum resource 3R selection unit
34 Minimum resource amount judgement unit
35 Minimum resource amount update unit
36 Unprocessed confirmation-required route check unit
41 Wavelength addition confirmation unit
42 Route confirmation unit
43 Route inclusion judgement unit
44 Wavelength addition unit
45 Existing maximum resource amount exceedance
   judgement unit (Excess judgement unit)
46 Resource amount update unit

The invention claimed is:

1. An optical path route design device comprising one or more processors configured to execute functions of:
   a transmission/reception route selection unit to select relay stations in which two transmission/reception end devices to transmit/receive optical signals with each other are arranged from among a plurality of relay stations connected to each other through optical transmission lines and relaying the optical signals, and select a route pair of an active system-0 route and a standby system-1 route, which connects the transmission/reception end devices with each other and does not overlap each other, and a backup third route detouring from the route pair via one or more relay stations;
   a candidate selection unit to select relay stations scattered on the selected third route as candidates in which 3R-capable (3R: Regenerate, Reshape, and Retiming) units to relay optical signals of predetermined wavelengths are arranged;
   an existence judgement unit to judge whether or not a shared 3R-capable unit exists in the selected candidate;
   a new 3R selection unit to newly select a shared 3R-capable unit from among the shared 3R-capable units in the selected candidates, when the existence judgement unit has judged as being non-existent; and
   a maximum resource 3R selection unit, when the existence judgement unit has judged as being existent, to select one shared 3R-capable unit if there is one existing shared 3R-capable unit, and select a shared 3R-capable unit having a maximum number of wavelengths as a resource amount of communication if there is a plurality of existing shared 3R-capable units.

2. The optical path route design device according to claim 1, the device being configured to execute functions of:
   a required resource amount confirmation unit to confirm the resource amount required for the shared 3R-capable unit on the third route for the route pair when a unitary link of the system-0 route or the system-1 route of the route pair has failed;
   an update unit to update the resource amount of the shared 3R-capable unit with the confirmed resource amount, when the confirmed resource amount exceeds the maximum required resource amount set in the shared 3R-capable function unit; and
   a determination unit to determine the confirmed resource amount as the maximum required resource amount of the shared 3R-capable unit when the update has not been performed, and determine the updated resource amount as the maximum required resource amount of the shared 3R-capable unit when the update has been performed,
   wherein a resource amount required for the shared 3R-capable unit is the number of wavelengths of the optical signals to be transmitted to the failed unitary link and, when the different route pairs have a common unitary link in failure, is the number of wavelengths obtained by adding the number of wavelengths of the optical signals to be transmitted to the common unitary link in failure.

3. The optical path route design device according to claim 1, the device being configured to execute functions of:
   a wavelength addition confirmation unit to confirm that wavelengths have been added to a route pair;
   a route confirmation unit to confirm the maximum resource amount of the shared 3R-capable unit on the third route for the route pair confirmed, by the wavelength addition confirmation unit, as having wavelengths added, and confirm a unitary link in failure for which the shared 3R-capable unit has the maximum resource amount before addition of the wavelengths, as shared with the third route for the other route pair;
   a route inclusion judgement unit to judge whether or not the unitary link, requiring the maximum resource amount and having a failure confirmed by the route confirmation unit, is included in the route pair having wavelengths added;
   a wavelength addition unit to add a resource amount of additional wavelengths to the maximum resource amount of the unitary link in failure requiring the maximum resource amount, when the route inclusion judgement unit has judged as being included;
   an exceedance judgement unit to judge whether or not a resource amount exceeds the existing maximum resource amount when the route inclusion judgement unit has judged as not being included and a unitary link of the route pair having the wavelengths added has failed; and
   a resource amount update unit to update the resource amount of the shared 3R-capable unit with the maximum resource amount confirmed by the route confirmation unit,
   when the exceedance judgement unit has judged that there is a case, wherein when the exceedance judgement unit has judged as not exceeding said amount, the maximum resource amount before addition of the wavelengths, confirmed by the route confirmation unit, is set as the resource amount of the shared 3R-capable unit.

4. An optical path route design device comprising one or more processors configured to execute functions of:
   an all transmission/reception route selection unit to execute processing for an optical network of selecting relay stations in which two transmission/reception end devices to transmit/receive optical signals with each other are arranged, from among a plurality of relay stations connected to each other through optical transmission lines and relaying the optical signals, selecting a route pair of an active system-0 route and a standby system-1 route, which connects the transmission/reception end devices with each other and does not overlap each other, and a backup third route detouring from the route pair via one or more relay stations, and selecting relay stations scattered on the selected third route as candidates in which 3R-capable units to relay optical signals of the predetermined number of wavelengths are arranged for a plurality of optical networks;

an all candidate selection unit to select all candidate arrangement patterns of shared 3R-capable units as 3R-capable units used for all third routes from among the candidate 3R-capable units on all the third routes selected in the optical networks;

a shared 3R resource amount confirmation unit to confirm the total resource amount of the shared 3R resource units for each arrangement pattern of the shared 3R-capable units selected by the all candidate selection unit;

a minimum resource amount update unit to update the minimum resource amount to be set in the shared 3R-capable unit with the confirmed resource amount, when the confirmed resource amount is less than the designed minimum required resource amount of the arrangement pattern set in the shared 3R-capable function unit, and a minimum resource 3R selection unit configured to select the arrangement pattern of a shared 3R-capable unit having the minimum resource amount and the resource amount of the shared 3R-capable units, as design candidates, from among the arrangement patterns of the shared 3R-capable units whose resource amount has been confirmed by the shared 3R resource amount confirmation unit and the arrangement patterns of the shared 3R-capable unit whose resource amount has been updated by the minimum resource amount update unit.

5. An optical path route design method executed by an optical path route design device, the optical path route design method comprising:

selecting relay stations in which two transmission/reception end devices to transmit/receive optical signals with each other are arranged from among a plurality of relay stations connected to each other through optical transmission lines and relaying the optical signals, selecting a route pair of an active system-0 route and a standby system-1 route, which connects the transmission/reception end devices with each other and does not overlap each other and a backup third route detouring from the route pair via one or more relay stations, and selecting relay stations scattered on the selected third route as candidates in which 3R-capable (3R: Regenerate, Reshape, and Retiming) units to relay optical signals of predetermined wavelengths are arranged;

judging whether or not a shared 3R-capable unit exists in the selected candidate;

newly selecting a shared 3R-capable unit from among the shared 3R-capable units in the selected candidates, when it has judged as being non-existent; and selecting, when it has been judged as being existent, one shared 3R-capable unit if there is one existing shared 3R-capable unit, and selecting a shared 3R-capable unit having the maximum number of wavelengths as a resource amount of communication if there is a plurality of existing shared 3R-capable units.

6. The optical path route design method according to claim 5, comprising:

confirming the resource amount required for the shared 3R-capable unit on the third route for the route pair when a unitary link of the system-0 route or the system-1 route of the route pair has failed;

updating the resource amount of the shared 3R-capable unit with the confirmed resource amount, when the confirmed resource amount exceeds the maximum required resource amount set in the shared 3R-capable unit; and determining the confirmed resource amount as the maximum required resource amount of the shared 3R-capable unit when the update has not been performed, and determining the updated resource amount as the maximum required resource amount of the shared 3R-capable unit when the update has been performed, wherein a resource amount required for the shared 3R-capable unit is the number of wavelengths of the optical signals to be transmitted to the failed unitary link and, when the different route pairs have a common unitary link in failure, is the number of wavelengths obtained by adding the number of wavelengths of the optical signals to be transmitted to the common unitary link in failure.

7. The optical path route design method according to claim 5, comprising:

performing a first confirmation of confirming that wavelengths have been added to a route pair;

performing a second confirmation of confirming the maximum resource amount of the shared 3R-capable unit on the third route for the route pair confirmed, with the first confirmation, as having wavelengths added, and confirming a unitary link in failure for which the shared 3R-capable unit has the maximum resource amount before addition of the wavelengths, as shared with the third route for the other route pair;

judging whether or not the unitary link, requiring the maximum resource amount and having a failure confirmed with the second confirmation, is included in the route pair having wavelengths added;

adding a resource amount of additional wavelengths to the maximum resource amount of the unitary link in failure requiring the maximum resource amount, when it has been judged as being included;

judging whether or not a resource amount exceeds the existing maximum resource amount when it has been judged as not being included and a unitary link of the route pair having the wavelengths added has failed;

updating the resource amount of the shared 3R-capable unit with the maximum resource amount confirmed with the second confirmation, when it has been judged that there is a case; and setting, when it has been judged as not exceeding said amount, the maximum resource amount before addition of the wavelengths, confirmed with the second confirmation, as the resource amount of the shared 3R-capable unit.

8. An optical path route design method executed by an optical path route design device, the optical path route design method comprising:

executing processing for an optical network of selecting in which relay stations in which two transmission/reception end devices to transmit/receive optical signals with each other are arranged, from among a plurality of relay stations connected to each other through optical transmission lines and relaying the optical signals, selecting a route pair of an active system-0 route and a standby system-1 route, which connects the transmission/reception end devices with each other and does not overlap each other and a backup third route detouring from the route pair via one or more relay stations, and selecting relay stations scattered on the selected third route as candidates in which 3R-capable units to relay optical signals of the predetermined number of wavelengths are arranged for a plurality of optical networks;

selecting all candidate arrangement patterns of shared 3R-capable units as 3R-capable units used for all third routes from among the candidate 3R-capable units on all the third routes selected in the plurality of optical networks;

confirming the total resource amount of the shared 3R resource units for each arrangement pattern of the selected shared 3R-capable units;

updating the minimum resource amount to be set in the shared 3R-capable unit with the confirmed resource amount, when the confirmed resource amount is less than the designed minimum required resource amount of the arrangement pattern set in the shared 3R-capable unit, and selecting the arrangement pattern of a shared 3R-capable unit having the minimum resource amount and the resource amount of the shared 3R-capable units, as design candidates, from among the arrangement patterns of the shared 3R-capable units whose resource amount has been confirmed and the arrangement patterns of the shared 3R-capable unit whose resource amount has been updated.

* * * * *